United States Patent
Agrawal et al.

(10) Patent No.: US 10,673,503 B2
(45) Date of Patent: Jun. 2, 2020

(54) METHOD AND DEVICE FOR PERFORMING BEAM FORMING

(71) Applicants: SAMSUNG ELECTRONICS CO., LTD., Suwon-si (KR); DELHI TECHNOLOGICAL UNIVERSITY, Delhi (IN)

(72) Inventors: Sachin Kumar Agrawal, Ghaziabad (IN); Kapil Sharma, Delhi (IN)

(73) Assignees: SAMSUNG ELECTRONICS CO., LTD., Suwon-si (KR); DELHI TECHNOLOGICAL UNIVERSITY, Delhi (IN)

( * ) Notice: Subject to any disclaimer, the term of this patent is extended or adjusted under 35 U.S.C. 154(b) by 0 days.

(21) Appl. No.: 16/110,793

(22) Filed: Aug. 23, 2018

(65) Prior Publication Data
US 2019/0068264 A1 Feb. 28, 2019

(30) Foreign Application Priority Data
Aug. 23, 2017 (IN) .............................. 201711029904

(51) Int. Cl.
*H04B 7/06* (2006.01)
*H04W 72/04* (2009.01)
*H04W 72/06* (2009.01)

(52) U.S. Cl.
CPC ......... *H04B 7/0617* (2013.01); *H04B 7/0632* (2013.01); *H04B 7/0695* (2013.01); *H04W 72/046* (2013.01); *H04W 72/06* (2013.01)

(58) Field of Classification Search
None
See application file for complete search history.

(56) References Cited

U.S. PATENT DOCUMENTS

| | | | |
|---|---|---|---|
| 8,487,813 B2 | 7/2013 | Leiba et al. | |
| 8,532,647 B2* | 9/2013 | Shin | H04B 7/0617 455/422.1 |
| 8,948,327 B2 | 2/2015 | Kludt et al. | |
| 9,078,142 B1 | 7/2015 | Zhan et al. | |
| 9,246,216 B2* | 1/2016 | Harel | H04B 7/0404 |
| 9,288,007 B2 | 3/2016 | Jover | |
| 9,331,754 B2* | 5/2016 | Kwon | H04B 7/0408 |
| 9,497,702 B2 | 11/2016 | Joung et al. | |

(Continued)

FOREIGN PATENT DOCUMENTS

WO 2016/114604 A1 7/2016

OTHER PUBLICATIONS

Martin Euchner "Overview of ITU, ITU-T, and ITU-T Study group 17" ITU Regional Workshop for the CIS countries and Georgia on Complex aspects of cybersecurity in infocommunications, Jun. 15-17, 2016 (25 pages) [retrieved from www.rcc.org.ru/1_euchner.pptx].

(Continued)

*Primary Examiner* — Ayaz R Sheikh
*Assistant Examiner* — Faiyazkhan Ghafoerkhan
(74) *Attorney, Agent, or Firm* — Sughrue Mion, PLLC

(57) ABSTRACT

A method and a device for performing beam forming are provided. The method includes determining plural obstruction free beam windows (OFBWs). Ranking values are determined for the OFBWs based on a ranking parameter. X OFBWs are selected from the plural OFBWs based on the ranking values that are determined, where X is a natural number determined randomly by a randomizer. One or more beams are formed based on the selected X OFBWs.

18 Claims, 14 Drawing Sheets

(56) References Cited

U.S. PATENT DOCUMENTS

| | | | |
|---|---|---|---|
| 9,967,886 B2* | 5/2018 | Ho | H04B 7/0408 |
| 2010/0131751 A1 | 5/2010 | Reznik et al. | |
| 2010/0238824 A1* | 9/2010 | Farajidana | H04B 7/0417 370/252 |
| 2011/0222616 A1* | 9/2011 | Jiang | H04B 7/0417 375/260 |
| 2013/0050007 A1 | 2/2013 | Ammar | |
| 2013/0273947 A1 | 10/2013 | Baek et al. | |
| 2014/0206367 A1* | 7/2014 | Agee | H04W 28/0236 455/450 |
| 2015/0138992 A1 | 5/2015 | Jover | |
| 2015/0289147 A1* | 10/2015 | Lou | H04B 7/0408 370/329 |
| 2016/0065294 A1 | 3/2016 | Kang et al. | |
| 2016/0087705 A1 | 3/2016 | Guey et al. | |
| 2016/0124401 A1 | 5/2016 | Li | |
| 2016/0191471 A1 | 6/2016 | Ryoo et al. | |
| 2016/0204849 A1 | 7/2016 | Behroozi et al. | |
| 2016/0327634 A1 | 11/2016 | Katz et al. | |
| 2017/0026938 A1 | 1/2017 | Onggosanusi et al. | |
| 2018/0048366 A1* | 2/2018 | Sundararajan | H04L 5/00 |
| 2018/0115358 A1* | 4/2018 | Raghavan | H04B 7/0639 |
| 2018/0115958 A1* | 4/2018 | Raghavan | H04B 7/0697 |
| 2018/0254811 A1* | 9/2018 | Agrawal | H04B 7/0617 |
| 2018/0332625 A1* | 11/2018 | Tsai | H04B 7/0408 |
| 2019/0068264 A1* | 2/2019 | Agrawal | H04B 7/0617 |
| 2019/0140713 A1* | 5/2019 | Cheng | H04L 25/0204 |
| 2019/0341989 A1* | 11/2019 | Raghavan | H04B 17/391 |

OTHER PUBLICATIONS

David Grey Simpson "Federal Communications Commission" Dec. 16, 2016 (19 pages total) [retrieved from https://apps.fcc.gov/edocs_public/attachmatch/DA-16-1282A1_Rcd.pdf ].

Nan Yang et al. "Safeguarding 5G Wireless Communication Networks Using Physical Layer Security" IEEE Communications Magazine, Apr. 2015, (pp. 20-27) [retrieved from https://www.researchgate.net/profile/Nan_Yang12/publication/275061284_Safeguarding_5G_Wireless_Communication_Networks_Using_Physical_Layer_Security/links/565e1a9c08ae1ef92983aa8a.pdf].

Georgios Karopoulos "Security and Privacy Challenges in 5G Networks" Department of Informatics and Telecommunications, 2016 [retrieved from http://www.charisma5g.eu/wp-content/uploads/2016/07/Security-andprivacychallenges-in-5G-networks.pdf] (19 pages total).

Karl Norrman "5G Security Standardization" Ericsson Research, May 11, 2016 [retrieved from https://www.sics.se/sites/default/files/pub/sics.se/SecurityDay16/karl_norrman.pdf] (17 pages total).

"Emerging Trends in 5G/IMT2020" Geneva Mission Briefing Series, Sep. 2016, [retrieved from https://www.itu.int/en/membership/Documents/missions/GVA-mission-briefing-5G-28Sept2016.pdf] (19 pages total).

Dr. Anand R. Prasad et al. "5G IOT Security" 4th Global Wireless Summit, NEC,, Nov. 28, 2016, [retrieved from http://5g.ieee.org/images/files/pdf/Workshop8Dec16/C4A-5G-IOTSecurity_] (20 pages total).

P. Wongchampa et al. "A Beamformer for 120-degree Secterization in LTE systems" WSEAS Transactions on Communications, vol. 14, 2015 [retrieved from http://www.wseas.org/multimedia/journals/communications/2015/a685704-481.pdf] (pp. 287-300).

Shaun Waterman "FCC looks to tackle loT cybersecurity through 5G regulation" Cyberscoop, Dec. 22, 2016 [retrieved from http://gadgets.ndtv.com/telecom/news/ericsson-iit-delhi-launch-5g-forindiaprogramme-1675307] (27 pages total).

"5G Security NOI", Fifth Generation Wireless Network and Device Security, Dec. 16, 2016 [retrieved from https://www.fcc.gov/document/5g-security-noi] (1 pages total).

* cited by examiner

METHOD AND DEVICE FOR PERFORMING BEAM FORMING

CROSS-REFERENCE TO RELATED APPLICATION(S)

This application is based on and claims priority under 35 U.S.C. § 119(a) from Indian patent application number 201711029904, filed on Aug. 23, 2017, in the Indian Patent Office, the disclosure of which is incorporated by reference herein in its entirety.

BACKGROUND

1. Field

Methods, apparatuses, devices, and article of manufacture consistent with the present disclosure relate to a method and a device for beam forming in a communication system.

2. Description of the Related Art

In a communication system that supports beam forming, a base station and a terminal included in the system may form a plurality of beams for transmitting and receiving signals. Particularly, each of the base station and the terminal may select an optimal beam among the plurality of beams according to a beam forming protocol, and transmit and receive a signal using the selected beam. The beam forming protocol may include a beam tracking procedure that may be performed continuously. The beam tracking procedure involves scanning a wide spectrum of reflected signals to obtain relevant parameters for optimal beam forming, which increases costs in terms of time, load, and power consumption. Further, secure transmission of data through the beams is difficult to achieve.

SUMMARY

It is an aspect to address at least the above-mentioned problems and/or disadvantages and to provide at least the advantages described below.

According to an aspect of one or more embodiments, there is provided a method comprising determining a plurality of obstruction free beam windows (OFBWs); determining ranking values for the plurality of OFBWs based on a ranking parameter; selecting X OFBWs from the plurality of OFBWs based on the ranking values that are determined, X being a natural number determined randomly by a randomizer; and forming one or more beams based on the selected X OFBWs.

According to another aspect of one or more embodiments, there is provided a device comprising a transmitting and receiving unit (TRU); and a controller coupled to the TRU and configured to determine a plurality of obstruction free beam windows (OFBWs); determine ranking values for the plurality of OFBWs based on a ranking parameter; select X OFBWs from the plurality of OFBWs based on the ranking values that are determined, X being a natural number determined randomly by a randomizer of the device; and form one or more beams based on the selected X OFBWs.

According to another aspect of one or more embodiments, there is provided a device comprising a transmitting and receiving unit (TRU); and a controller coupled to the TRU and configured to receive information regarding a beam from a base station, wherein the beam is formed based on an obstruction free beam window (OFBW) of X OFBWs which are selected from a plurality of OFBWs based on ranking values, where X is a natural number determined randomly by a randomizer of the base station; select a beam based on the received information; and communicate with the base station based on the selected beam.

BRIEF DESCRIPTION OF THE DRAWINGS

The above and other aspects will be more clearly understood from the following description taken in conjunction with the accompanying drawings, in which.

DETAILED DESCRIPTION

Figure 1:
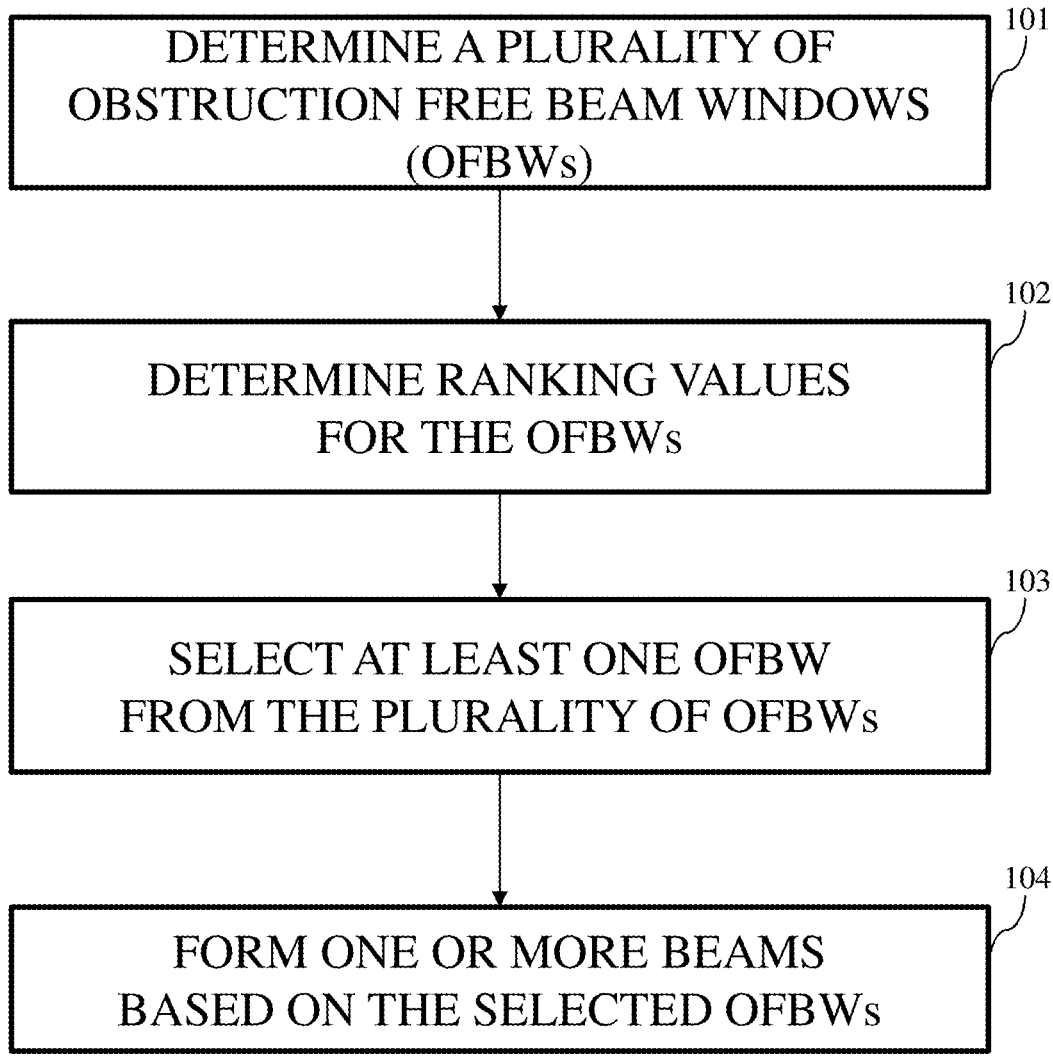
FIG. 1 is a flowchart of a method of performing beam forming according to an embodiment.

The following description with reference to the accompanying drawings is provided to assist in a comprehensive understanding of various embodiments of the disclosure as defined by the claims and their equivalents. The following description includes various specific details to assist in that understanding but these are to be regarded as merely exemplary. Accordingly, those of ordinary skill in the art will recognize that various changes and modifications of the various embodiments described herein may be made without departing from the scope and spirit of the disclosure as defined in the appended claims. In addition, descriptions of well-known functions and constructions may be omitted for clarity and conciseness.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the embodiments. Furthermore, the one or more elements may have been represented in the drawings by various symbols, and the drawings may show only those specific details that are pertinent to understanding the embodiments of the disclosure so as not to obscure the drawings with details that will be readily apparent to those of ordinary skill in the art having benefit of the description herein.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces. Additionally, the phrase "at least one of A and B" as used in this specification includes "only A", "only B" and "both A and B".

It may be advantageous to set forth definitions of certain words and phrases used throughout this document. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Moreover, various functions described below may be implemented or supported by one or more computer programs, each of which may be formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

The term "unit" or "device" may refer to a unit which processes at least one function or operation and may be implemented by hardware, software, or a combination of hardware and software.

Terms indicating network entities, terms indicating physical resources, terms indicating units of resources, terms indicating resource intervals according to purposes, and terms for distinguishing types of signals are only for the convenience of explanation. Therefore, the present disclosure is not limited to the terms described below and other terms indicating objects having the same technical meanings may be used.

According to various exemplary embodiments discussed herein, potential obstruction free beam window(s) are selected in a random manner that enables secure beam transmission. Further, the obstruction free beam window(s) are randomly selected based on ranking value and selection parameter(s). As such, the beam transmission satisfies both service-quality requirements and security requirements to the maximum. In addition, the transmitting antenna may perform beam transmission without having the need to know channel information of a wire-tapper in a network, thereby increasing the security during beam transmission. Further, time, load, and power consumption for beam forming is considerably reduced as the OFBWs is/are selected within an obstruction free zone and beam formation is based on the randomly selected obstruction free beam window(s) from amongst the plurality of OFBWs.

Figure 2:
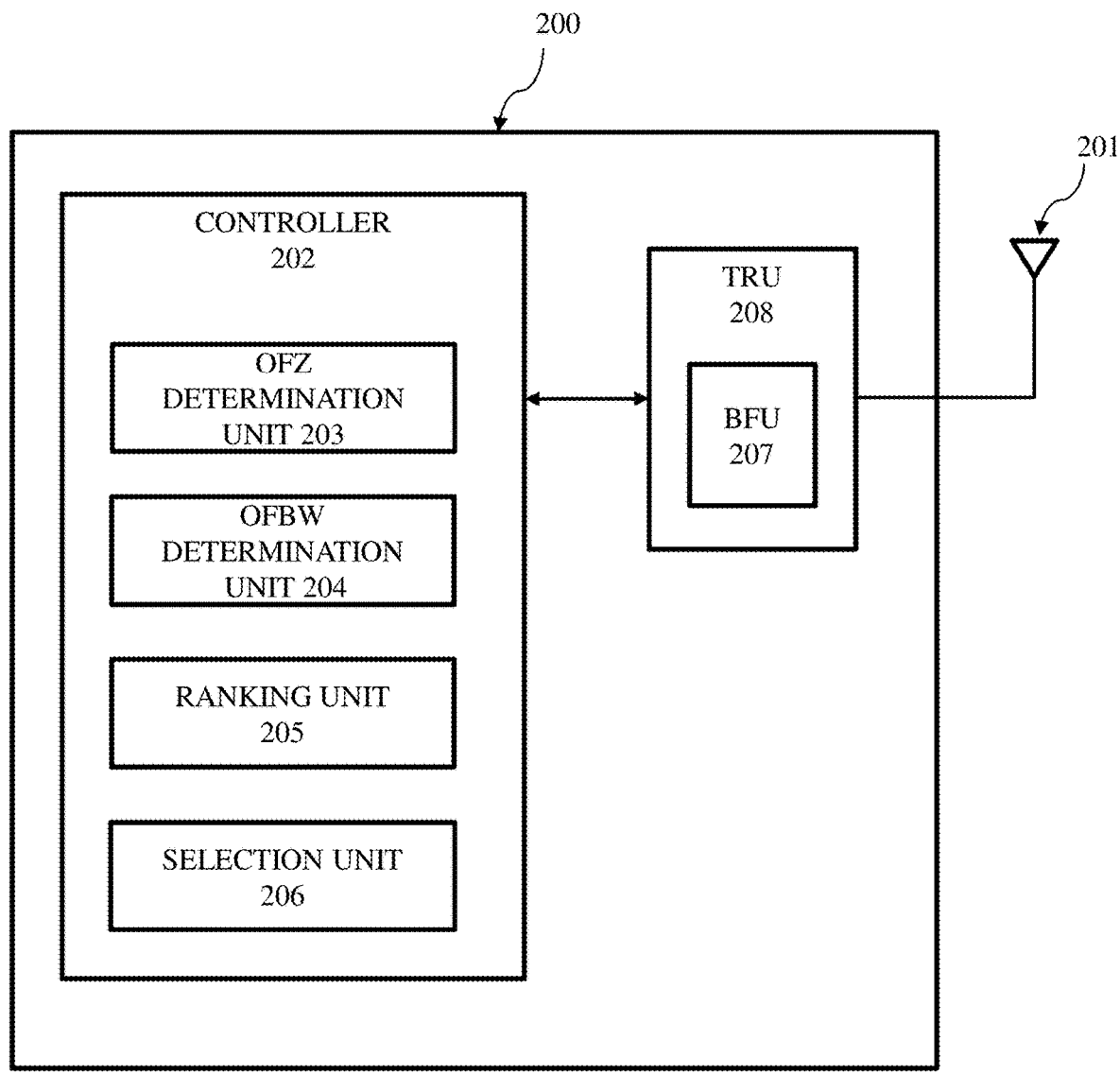
FIG. 2 is a block diagram of a device according to an embodiment.

FIG. 1 is a flowchart of a method of performing beam forming according to an embodiment, and FIG. 2 is a block diagram of a device according to an embodiment.

The device 200 includes a controller 202 and a transmitting and receiving unit (TRU) 208. The controller 202 may be implemented by one or more processors, such as a microprocessor or central processing unit (CPU). Similarly, the TRU 208 may be implemented by one or more processors, such as a microprocessor or central processing unit (CPU). The TRU 208 may control and perform a function of transmitting and receiving a signal to and from another device through one or more beams formed by a beam forming unit (BFU) 207. An antenna 201 may then transmit the signal in a direction of an antenna of the other device. The antenna 201 may be included in the device 200, but is not limited thereto, and in some embodiments may be located outside of the device 200. The antenna 201 may include, but is not limited to, a beam antenna and/or an array antenna which form one or more beams in a specific direction. In some embodiments, the antenna 201 may transmit a signal over 5G millimeter waves (mmWV). In an example, the antenna 201 may be capable of transmitting signals with one of several different discrete beam widths, or a continuously adjustable beam width instead.

Further, the device 200 and the antenna 201 may be integrated in an electronic device such as a smartphone, a wearable device, a virtual reality (VR) device, a base station, a vehicle, an unmanned aerial vehicles (UAVs), a low earth orbit (LEO) satellite, an autonomous small size robot such as a drone, a radar, and an Internet of Things (IoT) device, a wireless modem, a smart TV, etc. As such, the device 200 may also be integrated in the electronic device. The antenna 201 may transmit a signal in a direction to an antenna of a receiver.

Referring to FIG. 1, at operation 101, a plurality of obstruction free beam windows (OFBWs) may be determined. In some embodiments, the plurality of OFBWs may be determined or generated within at least one obstruction free zone (OFZ). The OFZ indicates a zone or geographical area that has negligible obstruction(s) and consequently provides minimal propagation/path losses during transmission of signals. The obstruction(s) may be manmade obstruction(s) or natural obstruction(s), for example, buildings/high-rise structures, trees, vehicles, rain, clouds, and a human body. The OFZ may be selected in a direction to an antenna of a receiver. As would be understood by those of skill in the art, a beam window allows formation of a beam which provides higher sensitivity in a specific direction, thereby allowing the control over the shape and steering of a directivity pattern of an antenna. As such, the OFBW allows formation of a high directional and efficient beam with minimal losses and overheads.

Referring to FIG. 2, the device 200 may include a controller 202. The controller 202 may include an OFBW determination unit 204, a ranking unit 205, and a selection unit 206. The controller 202 may further include an OFZ determination unit 203. In some embodiments, the OFZ determination unit 203 may be included in the OFBW determination unit 204. As discussed above, the term "unit" may refer to a unit which processes at least one function or operation and may be implemented by hardware, software, or a combination of hardware and software.

The OFZ determination unit 203 may determine at least one OFZ. The OFBW determination unit 204 may determine a plurality of OFBWs within the determined at least one OFZ. In some embodiments, the number of OFBWs determined within a single OFZ may be determined randomly by a randomizer of the device 200 to improve security during beam transmission. In some embodiments, the OFBW determination unit 204 may determine the maximum number of OFBWs based on window parameters of each of the OFBWs determined within the at least one OFZ and/or obstruction(s) within the at least one OFZ.

In some embodiments, the at least one OFZ may be determined by scanning reflected signal(s) received from one or more zones. In an example, the zone may be a geographical area covered by a single cell in which the antenna 201 of the device is operating. In another example, the zone may be a geographical area a certain distance away from a current geographical area/location of the antenna 201. The OFZ determination unit may obtain the reflected signal(s) using various techniques, for example, but a Frequency-Modulated Continuous millimeter waves (FMCmmWV) radar technique. The OFZ determination unit may determine the at least one OFZ based on the at least one parameter of the reflected signal(s) and data corresponding to at least one obstruction available in the one or more zones. The OFZ determination unit may retrieve such data corresponding to at least one obstruction from the reflected signal(s).

In some embodiments, the at least one OFZ may be determined based on at least one of: at least one parameter of at least one reflected signal received from one or more zones. The parameter of the reflected signal may include, but is not limited to, an intensity, an angle of arrival (AOA), an elevation angle, an azimuth angle, a frequency/Doppler shift, a time of arrival (TOA), a time difference of arrival (TDOA), a power of the signal, a signal to noise ratio, a signal to interference plus noise ratio, an interference, an offset, an energy, a variance, a correlation, and characteristics of at least one obstruction derived from the reflected signal.

In some embodiments, the at least one OFZ may be further determined based on data corresponding to at least one obstruction in the one or more zones. The data corresponding to the at least one obstruction may be obtained from a storage unit. The at least one OFZ may be further determined based on data corresponding to at least one obstruction encountered during transmission of information via one or more beams.

The OFBW determination unit 204 may determine the plurality of OFBWs within the determined at least one OFZ.

At operation 102, ranking values may be determined for the plurality of OFBWs based on a ranking parameter. The ranking parameter may include one or more of a signal quality, an attenuation, a propagation delay, a network efficiency, a quality of service (QoS), a latency, a signal-to-noise ratio (SNR), a channel capacity, a signal-to-interference ratio, and a user-input of a reflected signal using each of the plurality of OFBWs. The controller 202 may include the ranking unit 205. The ranking unit 205 may obtain the ranking parameter and determine the ranking value for the plurality of OFBWs based on the ranking parameter. In some embodiments, the ranking unit 205 may obtain the ranking parameter and determine the ranking value for each of the plurality of OFBWs based on the ranking parameter. As would be understood by those of skill in the art, the ranking value indicates a position in a hierarchy or scale. As such, an OFBW allowing formation of high directional and efficient beam with minimal/lowest losses and overheads is given the highest ranking value. The ranking value may be a numeral value with one (1) being a highest-ranking value. In some embodiments, the ranking unit 205 may determine N ranking values for N OFBWs determined within the OFZ. N may be a natural number determined randomly by a randomizer of the device 200, and may be equal to or less than a total number of the plurality of OFBWs, but is not limited thereto. As discussed above, the total number of the plurality of OFBWs may be a number selected by a randomizer of the device 200.

At operation 103, at least one OFBW may be selected from the plurality of OFBWs. Here, the X OFBWs may be selected from the plurality of OFBWs. The X OFBWs may be selected based on the ranking value and at least one selection parameter. The selection parameter may include, but is not limited thereto, a channel quality index, a channel state, a current time, a current location of the transmitting antenna, a number of users, one or more frequencies for transmission of information via the one or more beams, the at least one selected obstruction free zone, a total number of the plurality of OFBWs, and window parameters of the plurality of OFBWs, the window parameters include a length of a beam window and a parameter controlling spectral characteristics of the beam window.

The controller 202 may include a selection unit 206. The selection unit 206 may obtain at least one selection parameter. In an example, the selection unit 206 may obtain a channel quality index and a channel state between an antenna 201 of the device 200 (i.e., a transmitting device) and an antenna of another device (i.e., a receiving device). In another example, the selection unit 206 may determine window parameters of the plurality of OFBWs using techniques such as a Frequency-Modulated Continuous millimeter waves (FMCmmWV) radar technique and/or photonic radar based techniques.

Upon obtaining the selection parameter(s), the selection unit 206 may select at least one OFBW from the plurality of the OFBWs based on the ranking value and the selection parameter(s). Here, X OFBWs may be selected from the plurality of OFBWs based on the ranking value and the selection parameter(s), and X may be a natural number randomly determined by a randomizer of the device 200, and may be equal to or less than N, thereby, allowing different beams to be assigned to different users' devices at any instant of time for transmission to enhance security during beam transmission. Further, such random selection reduces time, load, and power consumption as continuous scanning for optimum beam window is considerably reduced. In some embodiments, the randomizer may be include d in the selection unit 206. In some embodiments, the selection unit 206 may include a group of randomizers. The randomizers may operate under a random seed data and may have random design to suit the application. The randomizers may be reset or may obtain data in a binary stream from the selection parameter(s).

At operation 104, one or more beams may be formed based on the selected OF BWs. For example, X beams may be formed based on the selected X OFBWs. As would be understood by those of skill in the art, beam forming may be used to direct and steer an antenna's directivity beam in a particular direction. Thus, formation of one or more beams based on the selected at least one OFBW may generate a secure, high directional and efficient beam with minimal losses and overheads.

The BFU 207 of the device 200 may form one or more beams in accordance with the selected OFBWs provided by the controller 202. The BFU 207 may be included in the TRU 208.

Further, the BFU 207 may employ various techniques to form the one or more beams, for example, an analogue beam forming technique using a phase shifter, a digital beam forming technique, a hybrid beam forming technique, and a technique of physically moving the antenna 201 to a previously defined direction, but is not limited thereto. The digital beam forming technique may include a fixed beam forming technique, an adaptive beam forming technique, an azimuth beam forming technique, an elevation beam forming technique, a 2D beam forming technique, and a 3D beam forming technique, but is not limited thereto. The Fixed beam forming technique may be used when locations of a signal source and a noise source are fixed with respect to the antenna 201. The fixed beam forming technique may include, but not limited to, a Delay-and-Sum technique, a Filter-and-Sum technique, and a Weighted-Sum based technique. The adaptive beam forming technique may be used when locations of a signal source and a noise source change with respect to the antenna 201. The adaptive beam forming technique may include, but not is limited to, a Generalised Sidelobe Canceller (GSC) technique, a Linearly Constrained Minimum Variance (LCMV, Frost) technique, an In situ Calibrated Microphone Array (ICMA) technique, a Minimum Mean Squared Error (MMSE) technique, a Zero-forcing (or null-steering) precoding, and a linear zero-forcing beamforming.

Figure 3:
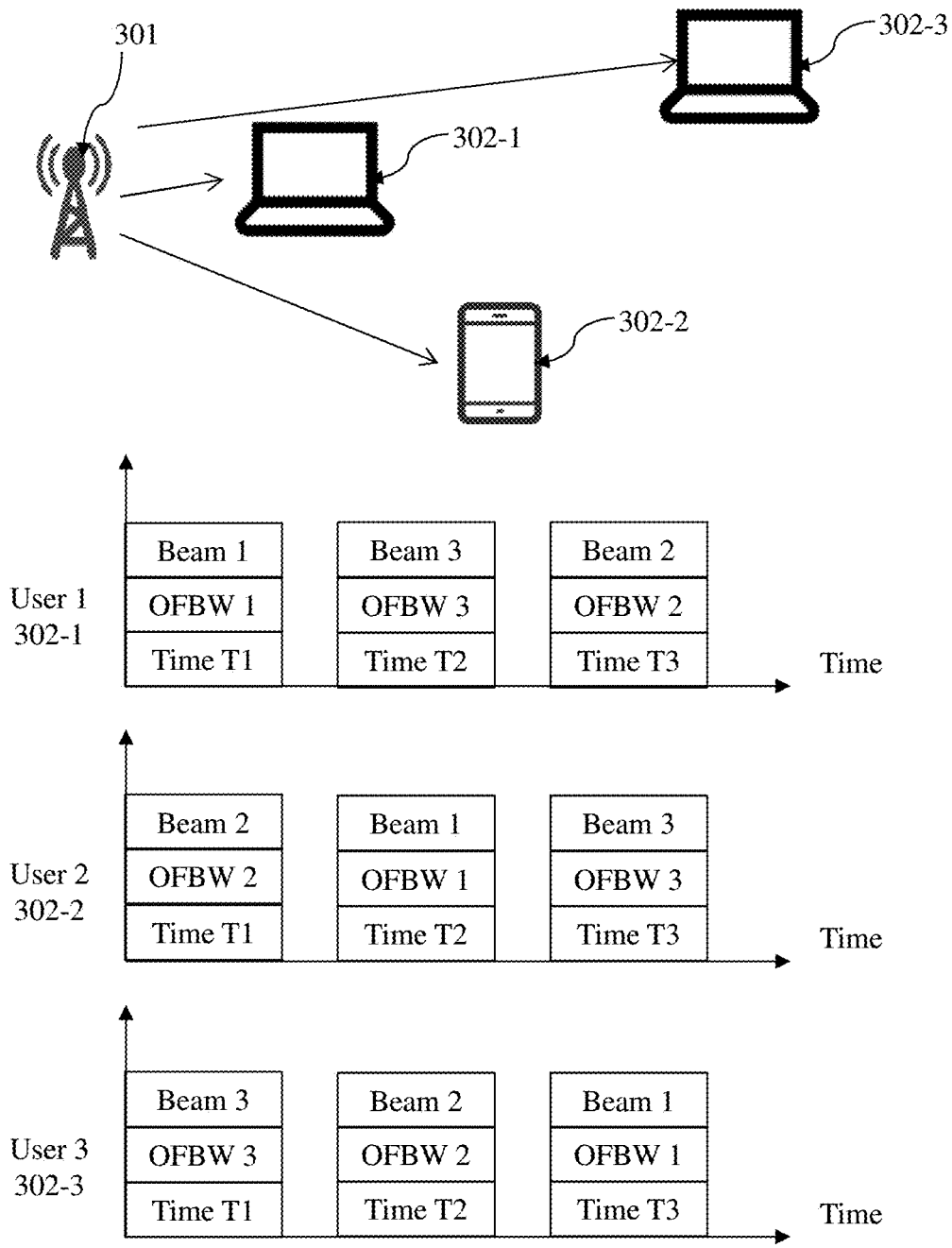
FIG. 3 is a diagram for explaining an example beam forming according to an embodiment.

FIG. 3 is a diagram for explaining an example beam forming according to an embodiment.

Referring to FIG. 3, a base station 301 may include an antenna to transmit signals to different devices 302-1, 302-2, and 302-3. The devices 302-1, 302-2, and 302-3 are used by user 1, user 2, and user 3, respectively. The base station 301 may transmit data by randomly assigning secure beams at various time instances through selected OFBWs. Accordingly, the base station 301 may determine a plurality of OFBWs, i.e., OFBW1, OFBW2, OFBW3 . . . OFBW-n, determine a ranking value of the OFBWs, and select X OFBWs based on the determined ranking value as described above (X is a natural number randomly determined by a randomizer of the base station 301). For the sake of clarity and brevity, OFBWs and beams are represented by squares in FIG. 3.

For device 302-1, the base station 301 may select OFBW1 at time T1 based on raking value and a selection parameter, as described above. OFBW1 may be randomly selected from the N OFBWs by a randomizer of the base station 301. The base station 301 then forms beam1 based on the OFBW1. The base station 301 transmits data to the device 302-1 via the beam 1, represented by solid arrow, as described above.

For device 302-2 and device 302-3 at time T1, the base station 301 may select OFBWs that are different from each other and also different from OFBW1 selected for device 302-1. Accordingly, the base station 301 may select OFBW2 for device 302-2 and OFBW3 for device 302-3. OFBW2 and OFBW3 may be randomly selected from the N OFBWs excluding OFBW1. The base station 301 then forms beam2 for transmission to device 302-2 based on OFBW2 and form beam3 for transmission to device 302-3 based on OFBW3.

At time T2, the base station 301 may select OFBW3 for device 302-1, OFBW1 for device 302-2, and OFBW2 for device 302-3. The base station 301 then forms beam3 for transmission to device 302-1 based on OFBW3, beam1 for transmission to device 302-2 based on OFBW1, and beam2 for transmission to device 302-3 based on OFBW2.

At time T3, the base station 301 may select OFBW2 for device 302-1, OFBW3 for device 302-2, and OFBW1 for device 302-3. The base station 301 then forms beam2 for transmission to device 302-1 based on OFBW2, beam3 for transmission to device 302-2 based on OFBW3, and beam1 for transmission to device 302-3 based on OFBW1.

According to some embodiments, the base station 301 may select different OFBWs at different time instances for each user, and select different OFBWs at same time instance for different users, thereby, enhancing security during beam transmission.

Random selection of OFBWs, or random assignment of OFBWs may be performed through various ways/mechanisms as described below. These different mechanisms may be employed in a combination, thereby, improving security during beam transmission.

Figure 4:
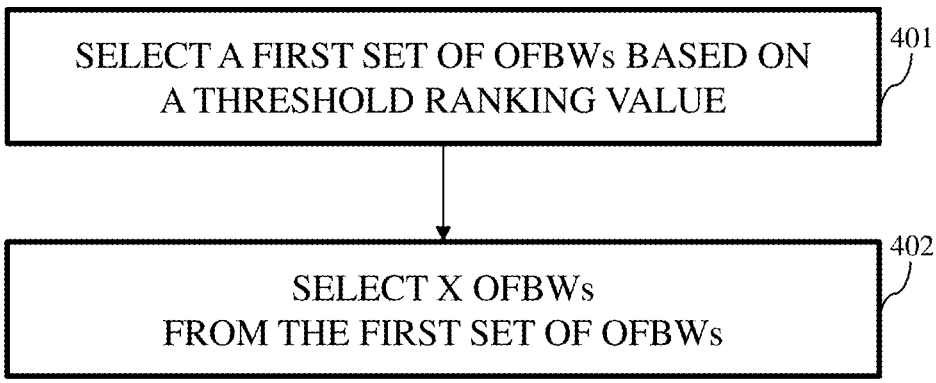
FIG. 4 is a flowchart of a method of using a first set of obstruction free beam windows (OFBWs) according to an embodiment.

FIG. 4 is a flowchart of a method of using a first set of OFBWs according to an embodiment. Explanation of FIG. 4 is described by further referring to FIG. 2.

At operation 401, a first set of OFBWs may be selected from the plurality of OFBWs. Each of the first set of OFBWs has a ranking value greater than a threshold ranking value. In some embodiments, the first set may be a non-null set.

The threshold ranking value may be represented by 'M' which is less than a number of total rankings T, i.e., M<T. The threshold value may be defined based on a total number of OFBWs and the number of total rankings. In some embodiments, the selection unit 206 may include a randomizer to determine the threshold ranking value randomly. In an example, the value of 'T' may be ten (10) and the value of 'M' may be six (6) that is randomly determined by the randomizer of the device 200. Accordingly, the selection unit 206 may selects all the OFBWs having a ranking value less than six, i.e., from 1 to 5 as the first set of OFBWs.

At operation 402, X OFBWs may be selected from the first set of OFBWs based on a selection parameter. In the above example, the selection unit 206 may select 5 OFBWs from the first set of OFBWs, each of which has a ranking value between 1 and 5, and has channel state information indicating minimal/negligible scattering and power decay with distance. That is, 5 OFBWs may be selected from the plurality of OFBWs. Here, the number of selected OFBWs ("X") is randomly determined by a randomly determined threshold ranking value, but all of the selected OFBWs have a higher ranking value than the threshold value among the plurality of OFBWs. Accordingly, quality of the selected OFBWs may be guaranteed.

In some embodiments, each OFBW may have a different rank in the first set of OFBWs. Accordingly, the selection unit 206 may select all the OFBWs from the first set of OFBWs if each OFBW corresponds to each rank, as described above. In the above example, the selection unit 206 selects all the OFBWs having a ranking value between 1 and 5.

Further referring to FIG. 3, a ranking value '1' may be assigned to OFBW1, a ranking value '2' to OFBW2, and a ranking value '3' to OFBW3, . . . , and a ranking value 'n' to OFBW-n at time T1. When the threshold ranking value is six (6), the base station 301 may select 5 OFBWs including OFBW1, OFBW2, OFBW3, OFBW4, and OFBW5 having a ranking value 1 to 5 as the first set of OFBWs. The base station 301 then assigns OFBW1 to the device 302-1, OFBW2 to the device 302-2, and OFBW3 to the device 302-3 at time T1 for beam transmission based on the selection parameter(s) as described above.

In another embodiment, some OFBWs may have the same rank values in the first set of OFBWs, and random selection may be performed.

Figure 5:
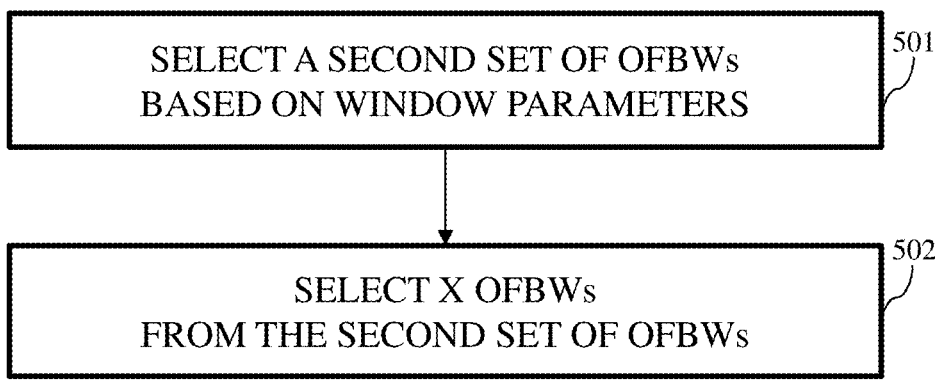
FIG. 5 is a flowchart of a method of using a second set of OFBWs according to an embodiment.

FIG. 5 is a flowchart of a method of using a second set of OFBWs according to an embodiment. Explanation of FIG. 5 is described by further referring to FIG. 2.

At operation 501 a second set of OFBWs may be selected from the first of OFBWs based on window parameters of the OFBWs. As mentioned above, some OFBWs in the first set of OFBWs have the same ranking values. In some embodiments, the second set may be a non-null set.

The selection unit 206 may determine window parameters of the OFBWs having the same ranking values to select second set of OFBWs.

In the above example, the first set of OFBWs may include two (2) OFBWs with a ranking value 1, five (5) OFBWs with a ranking value 2, one (1) OFBW with a ranking value 3, one (1) OFBW with a ranking value 4, and two (2) OFBWs with a ranking value 5. When it is determined that a length of beam window of OFBWs with a ranking value 2 results in minimal loss during beam transmission, the selection unit 206 may select the five (5) OFBWs with the same ranking value 2 as the second set of OFBWs.

At operation 502, X OFBWs may be selected from the second set of OFBWs based on a selection parameter. In the above example, the selection unit 206 may select 5 OFBWs from the second set of OFBWs having a longer beam window and having channel state information indicating minimal/negligible scattering and power decay with distance. That is, 5 OFBWs may be selected from the plurality of OFBWs. Here, the number of selected OFBWs ("X") is randomly determined by a number of OFBWs of the same ranking value, but all of the selected OFBWs result in minimal loss during beam transmission among the plurality of OFBWs. Accordingly, quality of the selected OFBWs may be guaranteed.

In some embodiments, a further random selection of OFBWs may be performed based on the first set of OFBWs. The selection unit 206 may include a first randomizer selecting the first set and a second randomizer selecting the second set. In some embodiments, the first randomizer and the second randomizer may be combined as a single randomizers.

Figure 6:
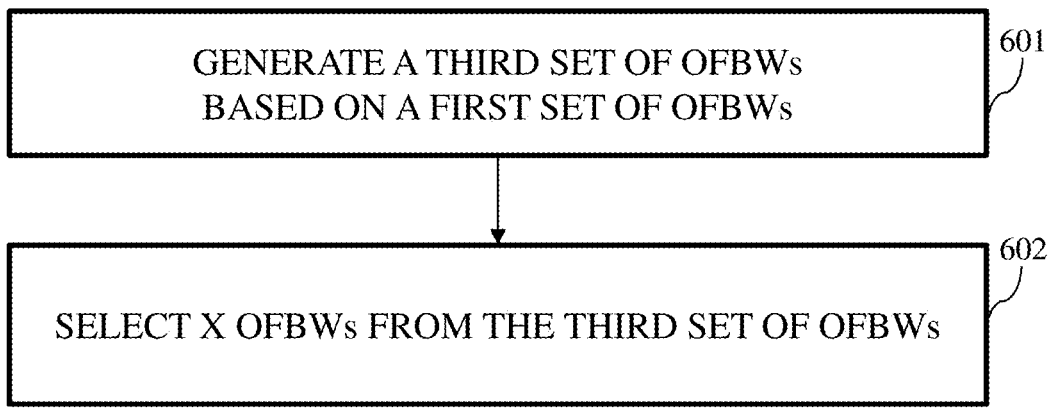
FIG. 6 is a flowchart of a method of using a third set of OFBWs according to an embodiment.

FIG. 6 is a flowchart of a method of using a third set of OFBWs according to an embodiment. Explanation of FIG. 6 is described by further referring to FIG. 2.

At operation 601 a third set of OFBWs may be generated based on the first set of OFBWs. The third set of OFBWs may be generated by controlling window parameters of the first set of OFBWs. In some embodiments, the third set may be a non-null set.

The selection unit 206 may determine window parameters of the first set of OFBWs. Upon determining, the selection unit 206 may control window parameters of one or more OFBWs among the first set of OFBWs. The window parameters may include a length of beam window and a parameter controlling spectral characteristics of the beam window. Such controlling of the window parameters of OFBWs may enable generation of the third set of OFBWs.

In some embodiments, the length of one or more OFBWs may be reduced within the limit of a maximum length of the OFBWs. As such, the selection unit 206 may analyze the length of each of the OFBWs in the first set of OFBWs to identify the maximum length of the first set of OFBWs. The selection unit 206 may determine reduction value(s) to reduce the length of OFBWs in the first set of OFBWs. The reduction value(s) may be defined based on a total number of OFBWs, a channel quality index, a channel state, a current location of an antenna of the device 200, signal quality, attenuation, propagation delay, network efficiency, quality of service (QoS), a latency, a signal-to-noise ratio (SNR), and a channel capacity, by using the random seed.

In some embodiments, the first set of OFBWs may include five (5) OFBWs with ranking values 1 to 5 and have a maximum length of L. A reduction value 2 may be determined for OFBW1 and OFBW3 such that lengths of OFBW1 and OFBW3 are reduced by 2. Similarly, a reduction value 1 may be determined for OFBW2 and OFBW5 such that lengths of OFBW2 and OFBW5 are reduced by 1. However, length of OFBW4 is retained as L.

Thus, new OFBWs may be randomly generated by reducing the size of the OFBWs present in the first set of OFBWs. Such random generation of OFBWs may improve security. Further, such randomly generated OFBWs help in forming secure, high directional and efficient beams with minimal losses and overheads.

In some embodiments, the OFBWs may be divided within the limit of a maximum length of the OFBWs. As such, the selection unit 206 may analyze a length of each OFBW of the first set of OFBWs to identify the maximum length. The selection unit 206 then may determine division value(s) to reduce the length of the first set of OFBWs. The division value(s) may be defined based on a total number of OFBWs, a channel quality index, a channel state, a current location of the transmitting antenna, signal quality, attenuation, propagation delay, network efficiency, quality of service (QoS), a latency, a signal-to-noise ratio (SNR), and a channel capacity, using the random seed.

In some embodiments, the first set of OFBWs may include five (5) OFBWs with ranking values 1 to 5 and have the maximum length L. A division value 3 may be determined for OFBW1 and OFBW3 such that each of the OFBW1 and OFBW3 may be divided by 3 to form OFBW1.1, OFBW1.2, OFBW1.3, OFBW3.1, OFBW3.2, and OFBW3.3. Similarly, a division value 2 may be determined for OFBW2 and OFBW5 such that each of the OFBW2 and OFBW5 may be divided by 2 to form OFBW2.1, OFBW2.2, OFBW5.1, and OFBW5.2.

Thus, new OFBWs may be randomly generated by dividing the size of the OFBWs present in the first set of OFBWs. Such random generation of OFBWs may improve security. Further, such randomly generated OFBWs help in forming secure, high directional and efficient beams with minimal losses and overheads.

At operation 602, X OFBWs may be selected from the third set of OFBWs. The X OFBWs may be selected based on the controlling window parameters of the plurality of OFBWs and selection parameters. In the above examples, the selection unit 206 may select the X OFBWs from the third set of OFBWs having shorter beam window and channel state information indicating minimal/negligible scattering and power decay with distance.

Thus, in the aforementioned embodiment, a further random selection of OFBWs is performed from the first random selection. As such, the selection unit 206 may include two randomizers such that a first randomizer selects the first set and a second randomizer selects the third set by controlling the window parameter(s). As would be understood by those of skill in the art, the beam formation is dependent upon the OFBW. Accordingly, the beam parameters will be modified based on the new random OFBWs thus generated by virtue of controlling the window parameters.

In some embodiments, a level of randomness may be selected, i.e., using the first set of OFBWs, the second set of OFBWs, and/or the third OFBWs from the plurality of OFBWs, for each time instance or each user-terminal or each antenna of the user-terminal. The selection unit 206 may select the level of randomness based on the selection parameter(s) and data corresponding to obstructions in the OFZs. In an example, the selection unit 206 may only use the first set of OFBWs to select the X OFBWs, and perform beam transmission based on the first set of OFBWs (i.e., the X OFBWs). In another example, the selection unit 206 may select the first set of OFBWs, then select the second set of OFBWs from the first set of OFBWs to select the X OFBWs, and perform beam transmission based on the second set of OFBWs (i.e., the X OFBWs). In another example, the selection unit 206 may first select the first set of OFBWs, then generate the third set of OFBWs from the first set of OFBWs to select the X OFBWs, and perform beam transmission based on the third set of OFBWs (i.e., the X OFBWs). Such selection of level of randomness controls a level of security during beam transmission.

In some embodiments, the selection unit 206 may select a level of randomness based on a user-input. The device 200 may be included in a user terminal, and the user terminal may further include a display unit to display values of the selection parameter(s) and the data corresponding to obstructions in the OFZs. Based on the value, a user may select the level of randomness. The user-terminal may further include an input-receiving unit to receive the user-input FIG. 7 is a diagram for explaining an example method of selecting an OFBW according to an embodiment.

Figure 7:
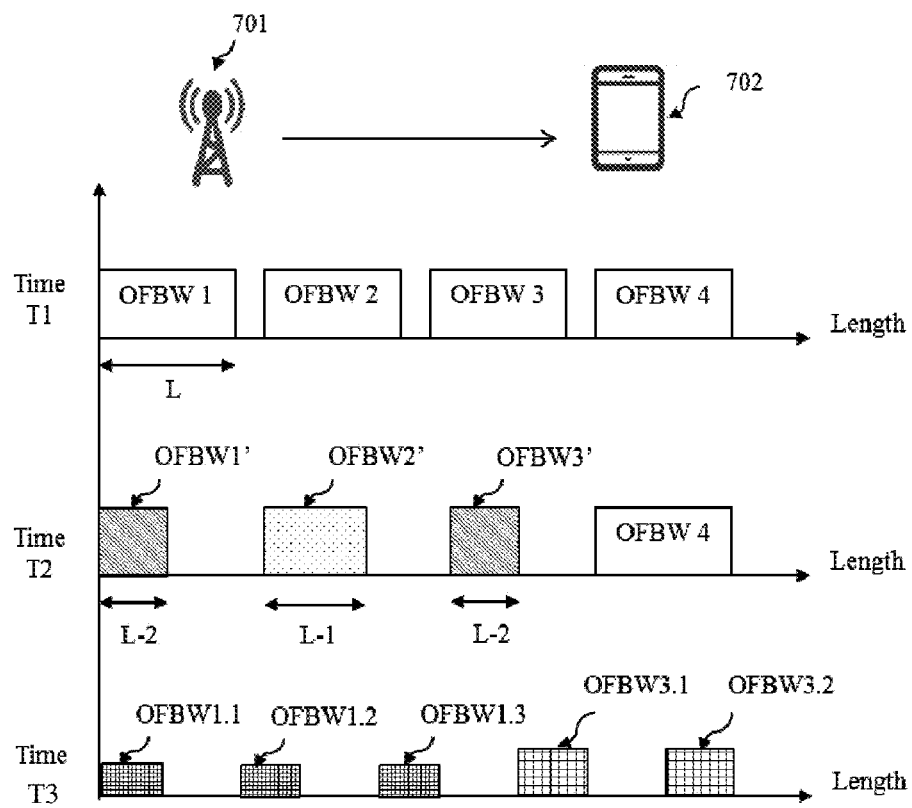
FIG. 7 is a diagram for explaining an example method of selecting an OFBW according to an embodiment.

Referring to FIG. 7, a base station 701 includes an antenna to transmit data to a device 702. The base station 701 may transmit data by assigning secure beams at various time instances through selected OFBWs as described above. Accordingly, the base station 701 may determine a plurality of OFBWs, i.e., OFBW1, OFBW2, OFBW3, OFBW4, . . . , OFBW-n, determine a ranking value of the OFBWs, e.g., ranking value '1' for OFBW1, ranking value '2' for OFBW2, and ranking value '3' for OFBW3, . . . , ranking value 'n' for OFBW-n. The threshold ranking value may be five (5) for selecting the first set of OFBWs. For the sake of clarity and brevity, OFBWs are represented by squares in FIG. 7. The base stations 701 may select OFBW1, OFBW2, OFBW3, and OFBW4 having ranking value 1 to 4 as the first set of OFBWs.

At time T1, the base station 701 may randomly select OFBW1, OFBW2, OFBW3, and OFBW4 for beam transmission as described above. Each OFBW has a length L. The base station 701 then may transmit encoded data/signal via beams formed using OFBW1, OFBW2, OFBW3, or OFBW4.

At time T2, the base station 701 may determine a reduction value, for example, 2 for OFBW1 and OFBW3 such that the OFBW1' and OFBW3' are formed with a length of "L−2". Similarly, the base station 701 may further determine a reduction value, for example, 1 for OFBW2 such that OFBW2' is formed with a length of "L−1". The base station 701 may retain a length of OFBW4 as L. Upon forming the new beams, the base station 701 may use OFBW1', OFBW2', OFBW3' and OFBW4 for beam transmission.

At time T3, the base station 701 may further determine a division value, for example, 3 for OFBW1' such that the OFBW1' may be divided by 3 to form OFBW1.1, OFBW1.2, and OFBW1.3. Similarly, the base station 701 may further determine a division value as 2 for OFBW3' such that OFBW3' may be divided by 2 to form OFBW3.1 and OFBW3.2. The base station 701 may not divide the OFBW2' and OFBW4. Upon forming the new beams, the base station 701 may then use OFBW1.1, OFBW1.2, OFBW1.3, OFBW3.1 and OFBW3.2 for beam transmission.

The formation of one or more beams may be performed through various ways as described below. Such ways enable various levels of random selection to greatly improving security during beam transmission.

In some embodiments, the beams may be formed without any further randomization or selection. In some embodiments, the beams may be formed by implementing operations of method 800 as described in FIG. 8.

Figure 8:
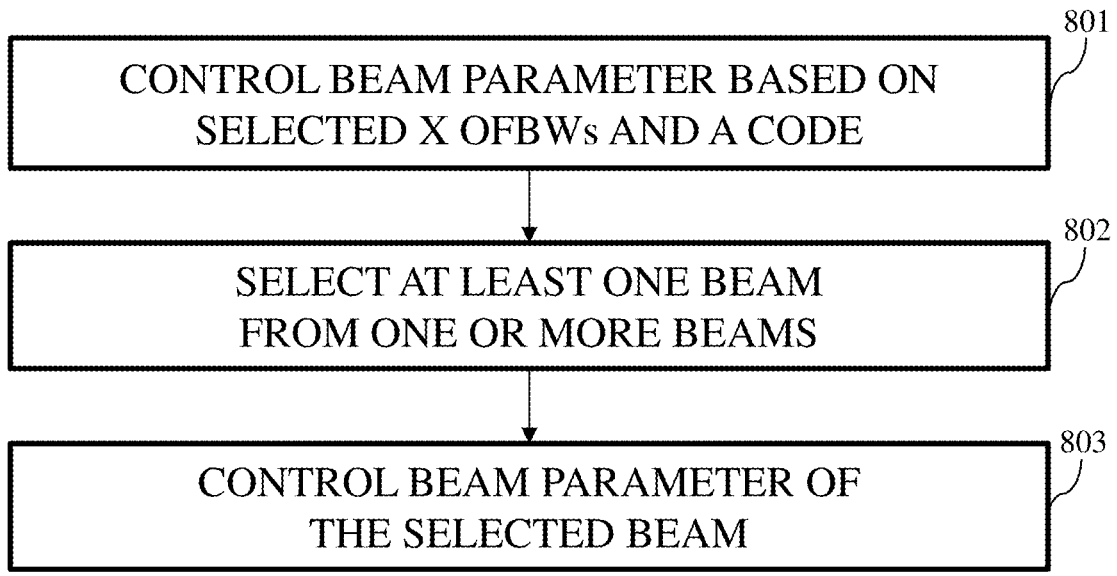
FIG. 8 is a flowchart method of controlling a beam parameter according to an embodiment.

FIG. 8 is a flowchart method of controlling a beam parameter according to an embodiment. Explanation of FIG. 8 is described by further referring to FIG. 2.

At operation 801, a beam parameter of one or more beams may be controlled based on the selected X OFBWs and a code selected from a codebook for transmission of information via the one or more beams. The beam parameter may include a weight gain, a frequency, a phase, an amplitude, a direction, a width, an intensity, a power, a signal to noise ratio, a signal to interference plus noise ratio, an interference, an output energy, a variance, a correlation, an elevation angle, and an azimuth angle of a beam. In some embodiments, one beam may be formed to correspond to each of the selected OFBWs. In some embodiments, multiple beams may be formed to correspond to the selected OFBWs respectively. In some embodiments, at least one beam may be formed to correspond to a combination of plurality of selected OFBWs.

The BFU 207 of the device 200 may form at least one beam by continually controlling the beam parameter based on a threshold value defined for the beam parameter and the codebook to satisfy predetermined conditions. The predetermined conditions include at least one of:

a weight gain of the at least one beam is lower than a gain threshold value;

a weight gain of the at least one beam is higher than the gain threshold value;

a weight gain of the at least one beam is equal to the gain threshold value;

a variance of the at least one beam is lower than a variance threshold value;

an output energy of the at least one beam is lower than an energy threshold value;

a power of the at least one beam is lower than a power threshold value;

a signal to noise (SNR) ratio of the at least one beam is higher than an SNR threshold value;

a signal to interference plus noise ratio (S/I+N) of the at least one beam is higher than a S/I+N threshold value; and an interference of the at least one beam is lower than an interference threshold value.

In some embodiments, the threshold values, as indicated above, may be stored in a storage of the device 200. It would be understood that the threshold value(s) might not be defined or set for all parameters. The threshold values may be added, updated, or modified after a beam formation for subsequent evaluation or scanning.

In some embodiments, the BFU 207 may also employ artificial intelligence to control the beam parameters. In some embodiments, the BFU 207 may also employ machine learning to control the beam parameters. In such embodiments, a multi-class classification model may be created by using a training set of data corresponding to the beam parameters. Thereafter, the multi-class classification model may be validated using a validation set of data, thus, beam parameters may be controlled by using of the validated model. Any suitable machine learning model may be used for a trained localized window selection model including, without limitation, an artificial neural network, a hidden Markov model (HMM), a Kalman filter (or enhanced Kalman filter), a Bayesian network (or Bayesian belief network), a support vector machine (SVM), a decision tree, etc., thereby, enabling reuse of the beam without compromising beam quality and beam security.

In some embodiments, the BFU 207 may obtain the codebook from the storage. In some embodiments, the BFU 207 may employ artificial intelligence or machine learning for generating an optimal codebook and select a code based on channel feedback and a receiver feedback for signal quality. In some embodiments, the BFU 207 may maintain the codebook at physical layer or radio layer of the user-terminal. In some embodiments, the BFU 207 may maintain the codebook in the storage. In some embodiments, an optimal codebook may be generated dynamically.

As would be understood by those of skill in the art, the codebook comprises codes or beam-forming weights/vectors that are aligned according to beam directions. In addition, the codes may be assigned to a particular receiving device or a group of receiving devices in a random or hybrid manner. Based on the codebook, the window parameters, and/or selection parameter(s), the BFU 207 may select code(s) or beam-forming weight(s) for secure beam-forming. In some embodiments, the BFU 207 may select code(s) or beam-forming weight(s) automatically for the receiving device(s). In some embodiments, the BFU 207 may select code(s) or beam-forming weight(s) for the receiving device (s) based on user-input.

Upon forming the at least one beam, the antenna 201 may then transmit a signal through the at least one formed beam in a direction to a receiving antenna. Accordingly, the TRU 208 may control and perform a function of transmitting a signal to the receiving antenna through the at least one beam formed by the BFU 207. The TRU 208 may encode the signal by a code selected by the BFU 207 prior to transmitting in order to improve security. The antenna 201 (i.e., a transmitting antenna) may then transmit the encoded signal in the direction to the receiving antenna.

Further, in some embodiments, upon forming the beam and selecting the beam-forming weight, the TRU 208 of the device 200, i.e., transmitting device, may share the codes/beam-forming weights and/or a direction with a corresponding device (i.e., a receiving device) having an antenna (i.e., a receiving antenna). The TRU 208 may share the codes/beam-forming weights and/or a direction via a separate high-secure channel, which enables the receiving antenna to tune in the direction and receive the high-gain secure beam transmitted by the transmitting antenna 201. As such, minimum service-quality requirements of the receiving device and maximum-security requirement of the transmitting device are satisfactorily met since a wire-tapper is unable to interpret the security codes/direction of the beam.

Further, in some embodiments, upon forming the at least one beam and transmitting the signal, the BFU 207 may change the beam-forming pattern upon reception of security alert to establish a physical layer security. In an example, the BFU 207 may change the beam-forming pattern automatically. In another example, the BFU 207 may change the beam-forming pattern upon receiving a user-input from the user-terminal. In another example, the BFU 207 may change the beam-forming pattern upon receiving a notification from a central server.

Further, in some embodiments, upon forming the at least one beam and transmitting the signal, the BFU 207 may change or reset the beam-forming pattern based on random clock cycles.

Further, in some embodiments, upon forming the at least one beam and transmitting the signal, at least one function may be performed with respect to data pertaining to one or more of (a) OFZs, (b) OFBWs, and (c) the at least one beam. The at least one function may include, but is not limited to, storing, transmitting, metadata associating, tagging, ranking, and recommending. The controller 202 may store the aforementioned data in a storage of the device 200. Similarly, the BFU 207 may store the aforementioned data in the storage.

In some embodiments, the BFU 207 may obtain data corresponding to at least one obstruction encountered during transmission of information via the one or more beams. The BFU 207 may determine that the data satisfies at least one predefined condition based on transmission parameters. The predetermined condition may be:

an obstruction being stationary and the presence of the obstruction causing delay/loss of a threshold time; and an obstruction being movable and the movement of the obstruction causing delay/loss of a threshold time.

In some embodiments, the threshold times, as indicated above, may be stored in the storage of the device 200. The threshold times may be different for the stationary and moveable cases. It would be understood that the threshold value(s) or time(s) may not be defined or set for all parameters. The threshold values or times may be added, updated, or modified after the beam formation for subsequent evaluation or scanning.

The transmission parameters may include one or more of channel sense information, a channel quality indicator, a channel feedback strength, data pertaining to a transmitting antenna, data pertaining to a receiving antenna, a direction of the receiving antenna, and cellular information. The BFU 207 may obtain values of the transmission parameters. Thereafter, the BFU 207 may control the at least one beam parameter of the one or more beams based on the selected OFBWs and the beam coding pattern.

In some embodiments, if the predetermined conditions are not met or the security alert is persistent, the BFU 207 may notify to the controller 202 to re-initiate the entire process of beam forming as indicated in FIG. 1 above.

In some embodiments, a random selection of beam may be performed upon formation of the beams at operation 801. As such, at operation 802, at least one beam may be selected from the one or more beams. The at least one beam may be selected based on the at least one beam parameter of the one or more beams, the selected OFBWs, and the at least one selection parameter.

At operation 803, the at least one beam parameter of the at least one selected beam may be controlled based on the selected code.

The BFU 207 may randomly select at least one beam from the plurality of beams and then controls the beam parameter(s) of the selected beam, thereby, improving security during beam transmission.

In some embodiments, the one or more beams may be formed by randomly selecting beam parameters.

Figure 9:
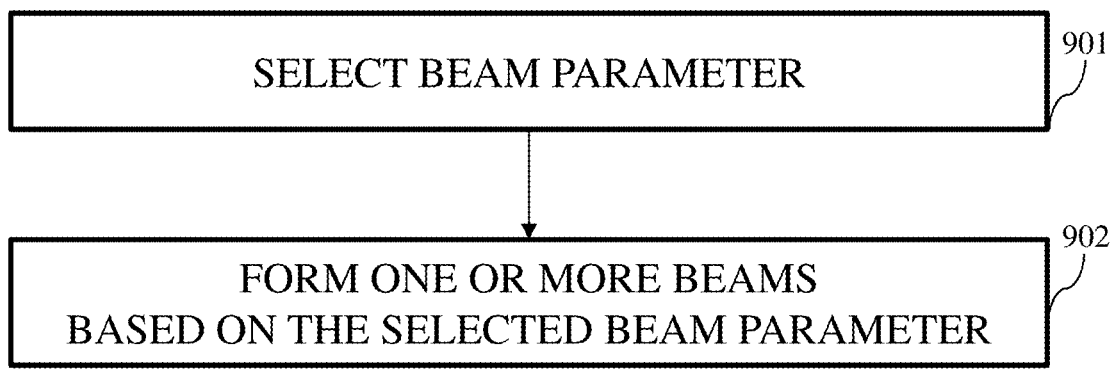
FIG. 9 is a flowchart of a method of performing beam forming based on a beam parameter according to an embodiment.

FIG. 9 is a flowchart of a method of performing beam forming based on a beam parameter according to an embodiment. Explanation of FIG. 9 is described by further referring to FIG. 2.

At operation 901, at least one beam parameter may be selected based on the selected OFBWs. The at least one beam parameter may be selected based on the codebook and the selected OFBWs. As indicated earlier, the BFU 207 may obtain the codebook from the storage or generate the codebook. The codebook may be generated dynamically.

At operation 902, the one or more beams may be formed based on the selected at least one beam parameter. The BFU 207 may form the beams by controlling the beam parameters as described at operation 801.

Such random selection of beams based on beam parameters enables transmitting of signals using a suitable beam capable of reaching the receiving antenna. For example, a beam having a narrow beam width may be able to reach an area within a particular angle range from the antenna 201. The narrower-beam may be used since the narrow-beam may reach a particular receiving antenna. Accordingly, an angle range may be assigned to the narrow-beam. Likewise, a beam having a medium beam width may be able to reach an area larger than an area covered by the narrower-beam. Similarly, a beam having a wider beam width may be able to reach an area larger than the areas covered by the beams having a narrower beam width and a medium beam width.

Since the narrower-beam may be used when available, the medium beam may only be assigned to an angle range that signals with the medium beam may reach, but signals with the narrower-beam cannot reach. Likewise, the wider beam may only be assigned to an angle range that signals with the wider beam may reach, but signals with the narrow-beam and medium cannot reach. As such, the BFU 207 may select the best available beam for transmission that is highly secure and has minimal losses.

Figure 10:
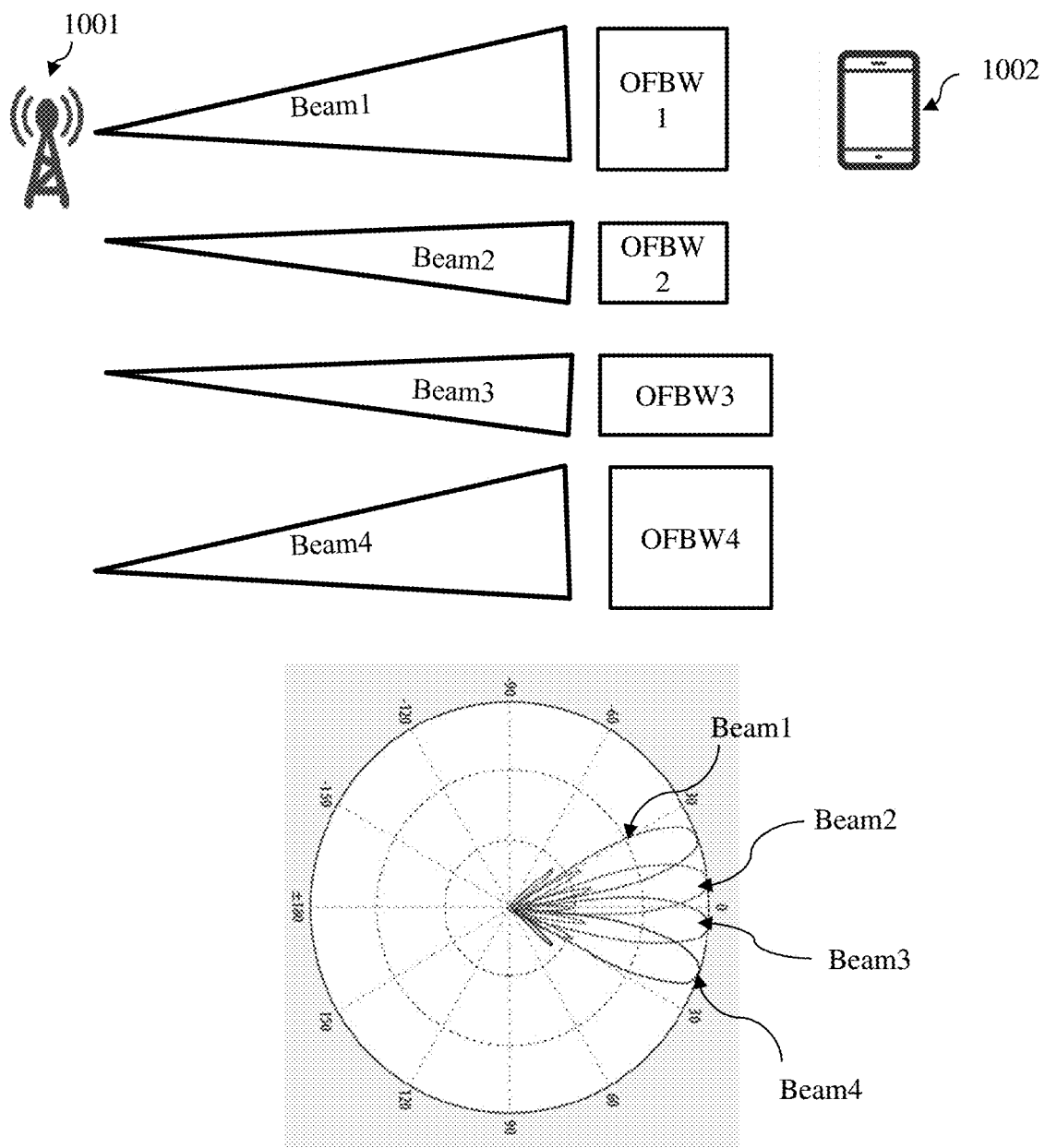
FIG. 10 is a diagram for explaining an example beam forming method according to an embodiment.

FIG. 10 is a diagram for explaining an example beam forming method according to an embodiment. Referring to FIG. 10, a base station 1001 includes an antenna to transmit data to a device 1002. The base station 1001 transmits data by assigning of secure beams at various time instances through random OFBW selection and random beam forming as described above. Accordingly, the base station 1001 selects 4 OFBWs, i.e., OFBW1, OFBW2, OFBW3, and OFBW4 of different widths. For the sake of clarity and brevity, OFBWs are represented by squares in FIG. 10.

Based on OFBWs, the base station 1001 may select beam width as a parameter for random selection of beams and form one or more beams including beam1, beam2, beam3, and beam4. For the sake of clarity and brevity, beams are represented by triangles in FIG. 10. Further, beam1 and beam 4 may be wider beams and therefore are assigned to an angle range of 30°. Beam2 and beam 3 may be narrower beams and therefore are assigned to an angle range of 15°, which further enables secure beam transmission while a specific beam may be randomly selected based on an assigned angle.

Further, in some embodiments, the user-terminal may include an antenna, and the device 200 may be capable of communicating with another user-terminal including an antenna over 5G millimeter wave. As such, the antenna of the device (i.e., a transmitting antenna) transmits a signal over 5G millimeter wave and the antenna of the other user-terminal (i.e., a receiving antenna) receives a signal over 5G millimeter wave. As would be understood by those of skill in the art, the 5G communication systems are designed to provide a flexible radio access network (RAN) and to provide the necessary adaptability for handling the fluctuations in the traffic demands. Hence, there is a requirement of high degrees of flexibility and decentralization in the network security functions, such as authentication, authorization and accounting (AAA). Therefore, the modern technology of network function virtualization (NFV) and Software Defined Networking (SDN) support distributed 5G AAA. By distributing databases to all edge clouds instead of central cloud, 5G AAA enables a flexible and decentralized decision and application of security policies in every edge cloud. Embodiments of the present disclosure may be seamlessly integrated with the 5G AAA architecture, thereby, enabling random selection of OFBWs and formation of beams based on the randomly selected beams. As such, the security during beam transmission may be highly improved.

Although, the above description explains the method of beam forming for the transmitting antenna, it is to be understood that same method may be implemented for the receiving antenna. As such, the receiving antenna may also be coupled with a device having units as explained above.

Thus, an efficient and high direction beam may be formed based on randomly selected OFBWs with minimal losses according to some embodiments, which increases security during beam transmissions. Further, time, load, and power required to search for a beam path with minimal propagation loss and maximum security may be also reduced.

Further, the next generation wireless networks utilize millimeter waves (mm-waves) for communication to achieve extremely high data rates using narrow signal beams. It is difficult to intercept a signal of mm-waves due to a high directivity and susceptibility to blockage by obstructions. Hence, transmission and reception of signals over millimeter waves is highly secure. A guaranteed level of channel quality may be maintained during transmission and reception by way of randomizing the OFBWs and beams according to some embodiments, thereby, improving the security.

As such, the exemplary embodiment discussed above may be implemented for various communication systems for transmitting and receiving signals with minimal losses and minimal delay. Examples of communication systems include, but not limited to, Multiple Input Multiple Output (MIMO) communication systems, Multiple Input Single Output (MISO) communication systems, Single Input Multiple Output (SIMO) communication systems, etc.

Similarly, the various exemplary embodiments discussed above may be implemented within devices/systems/apparatus operating in various wireless/cellular networks for transmitting and receiving data with minimal losses and minimal delay. Examples of network include, but not limited to, indoor wireless networks, outdoor wireless networks, core network interfaces, back end networks, cloud based networks such as device-to-device (D2D) network and machine-to-machine (M2M) network, etc.

Figure 11:
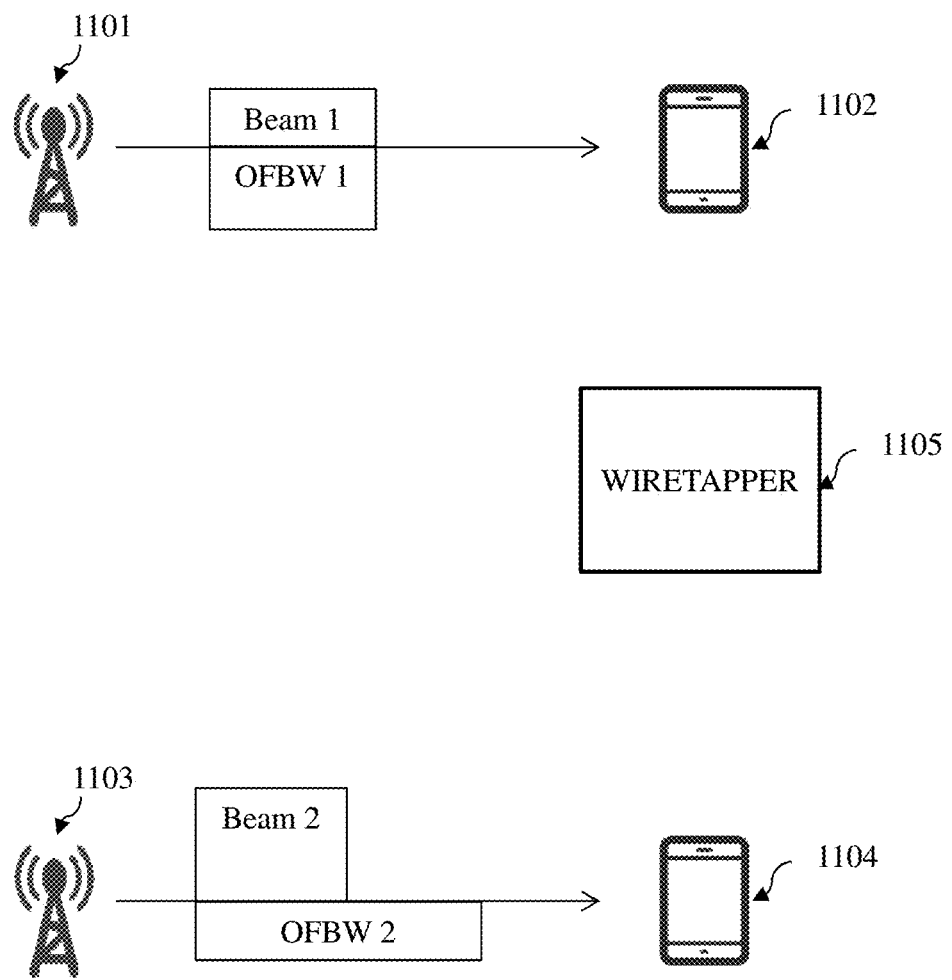
FIG. 11 is a diagram for explaining communication of signal according to an embodiment.

FIG. 11 is a diagram for explaining communication of signal according to an embodiment. As illustrated in FIG. 11, various embodiments of the present disclosure may be applied to a wireless communication system that includes a first transmitter 1101, a first receiver 1102, a second transmitter 1103, and a second receiver 1104, to guard against a wiretapper 1105. As would be understood by those of skill in the art, the wiretapper 1105 is an unauthorized device that may wiretap a transmitted signal or a received signal to acquire information. As described earlier, the first transmitter 1101 and the second transmitter 1103 may determine plurality of OFBWs and assign ranking values to the plurality of OFBWs. The first transmitter 1101 and the second transmitter 1103 may randomly select at least one OFBW based on ranking values and selection parameters. Accordingly, the first transmitter 1101 may select OFBW1, form a secure beam, i.e., beam1, based on OFBW1 and transmit signal using the beam1 to the first receiver 1102. The second transmitter 1103 may select OFBW2, form a secure beam, i.e., beam2, based on OFBW2, and transmit signal using the beam2 to the second receiver 1104. Since each of the transmitters 1101 and 1103 generates random OFBWs and random beams, the wiretapper 1105 is unable to wiretap the transmitted signal/received signal. Thus, the security is greatly increased while beam transmission.

Figure 12A:
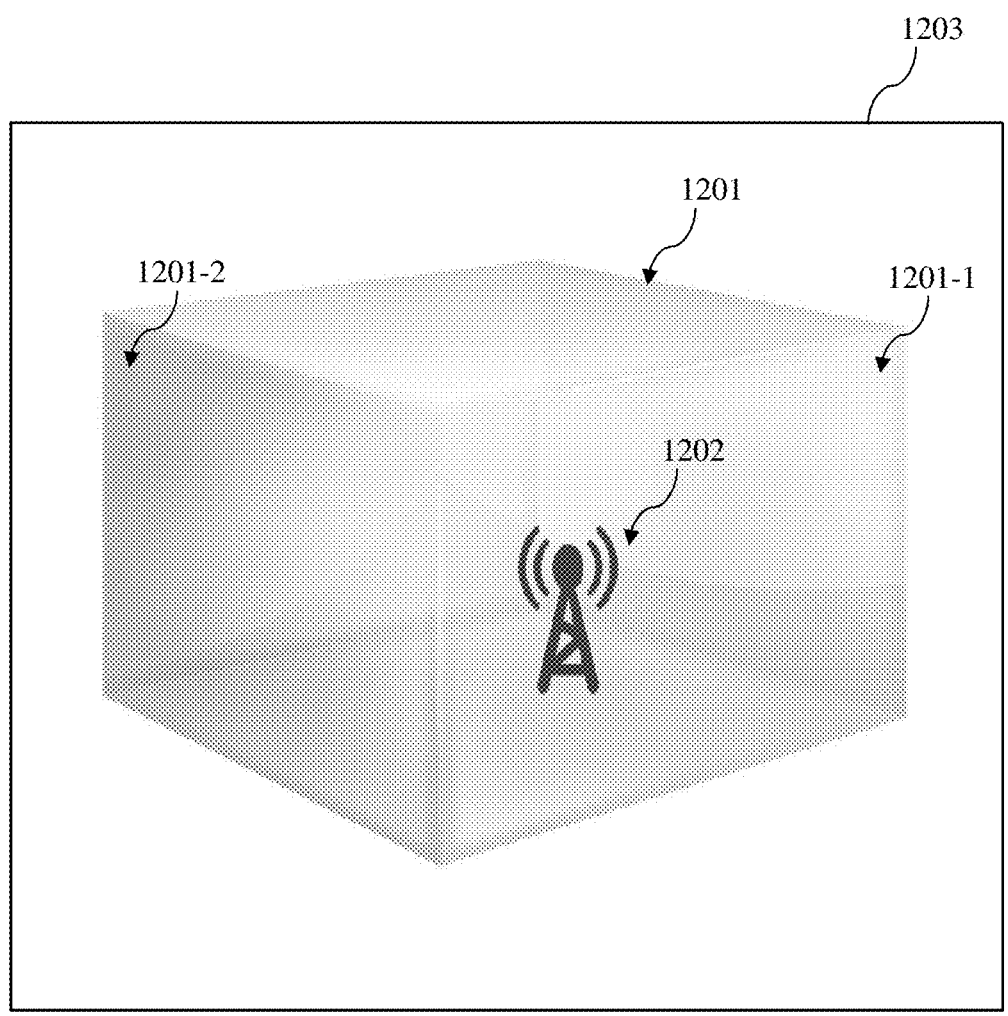
FIGS. 12A and 12B are diagrams for explaining an example beam forming method according to an embodiment.
Figure 12B:
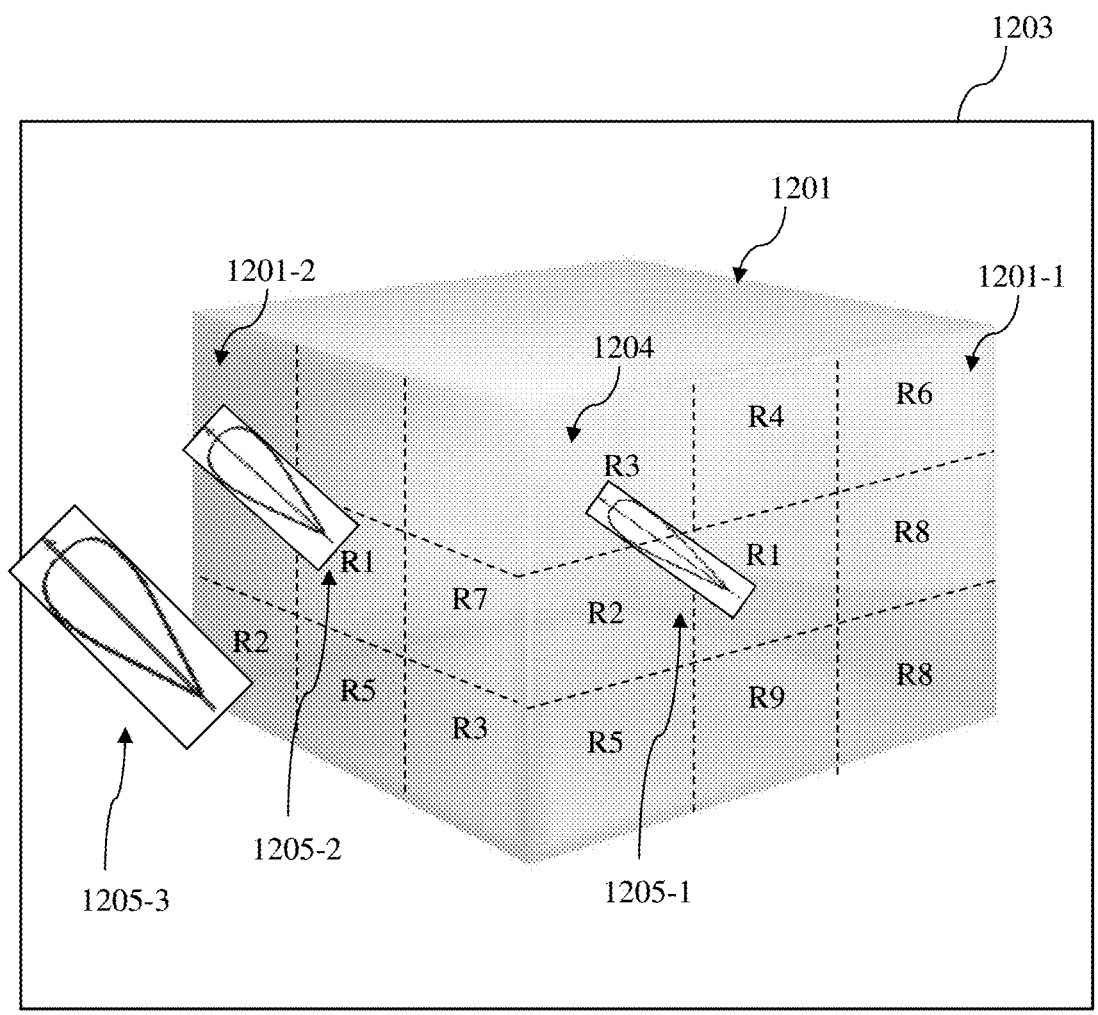

FIGS. 12A and 12B are diagrams for explaining an example beam forming method according to an embodiment. As illustrated in the FIG. 12A, a virtual three-dimensional space 1201 in the form of a cube may be created around an antenna of a base station 1202 (e.g., a transmitting antenna). The virtual three-dimensional space 1201 may be displayed on a display 1203. In the example, a receiving antenna may be located in a direction of side faces 1201-1 and 1201-2, and the side faces 1201-1 and 1201-2 may be selected as OFZs.

Referring to FIG. 12B, one or more grids 1204 may be created on the side faces. The one or more grids may divide side faces of the virtual three-dimensional space into an n by m matrix, wherein a value of n is at least equal to one (1); and a value of m is at least equal to one (1). The grids may form portions representative of OFBWs. For each of the portions defined by the grid, a ranking value is assigned as R1, R2, R3, . . . , etc. Based on the ranking value, the portions of the grid (i.e., OFBWs) having ranking values 1 and 2 may be selected when the number of selected OFBWs ("M") is determined as 3 by a randomizer of the base station 1202 as discussed above, and secure beams 1205-1, 1205-2, and 1205-3 may be formed as described above. The ranking value may be also assigned based on a user-input. For example, the virtual three-dimensional space 1201 may be displayed on a display 1203 to allow a user to assign ranking values to portions defined by the grid, thereby, selecting an OFBW.

Figure 13A:
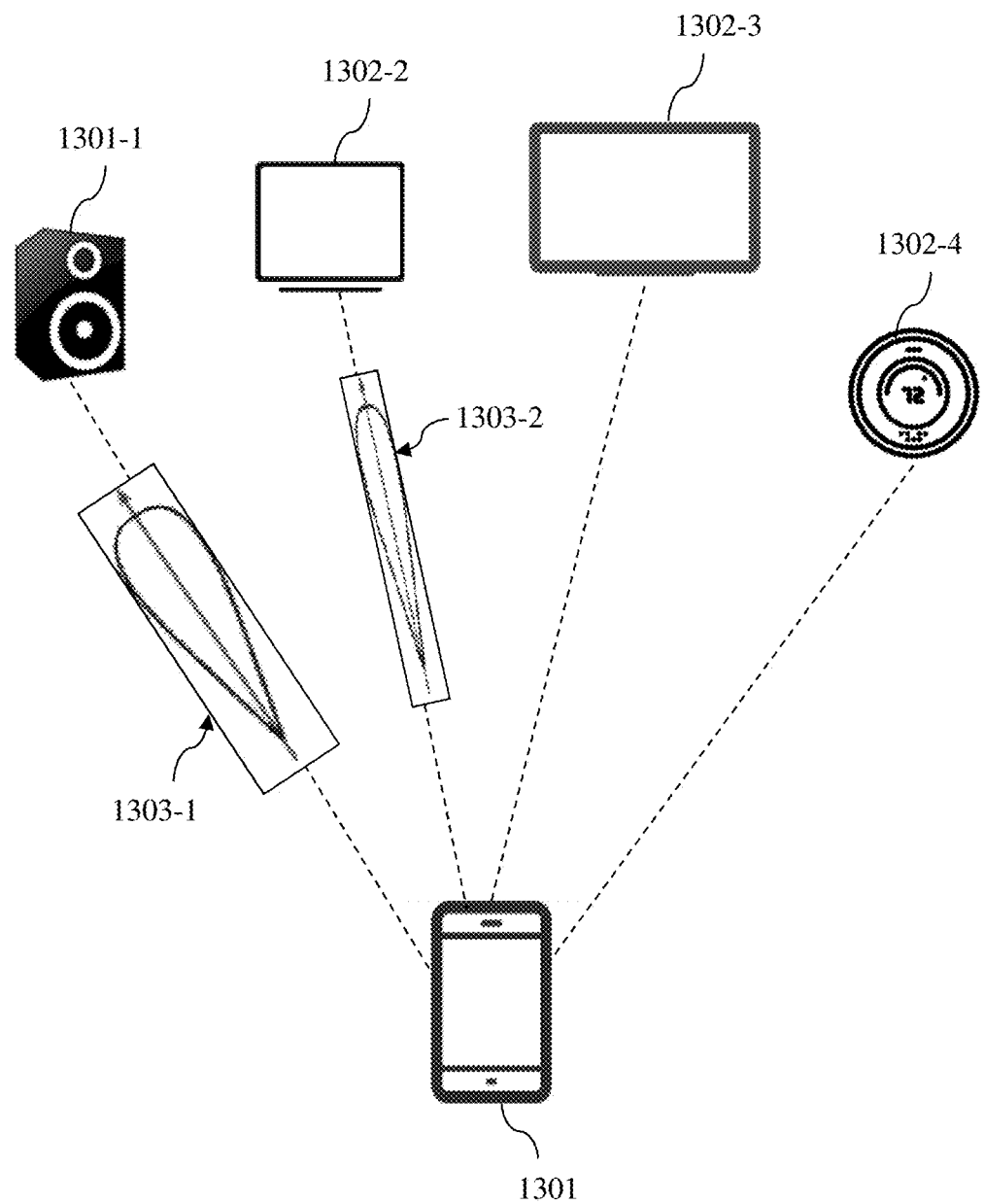
FIGS. 13A and 13B are diagrams for explaining an example beam forming method for user devices according to an embodiment.
Figure 13B:
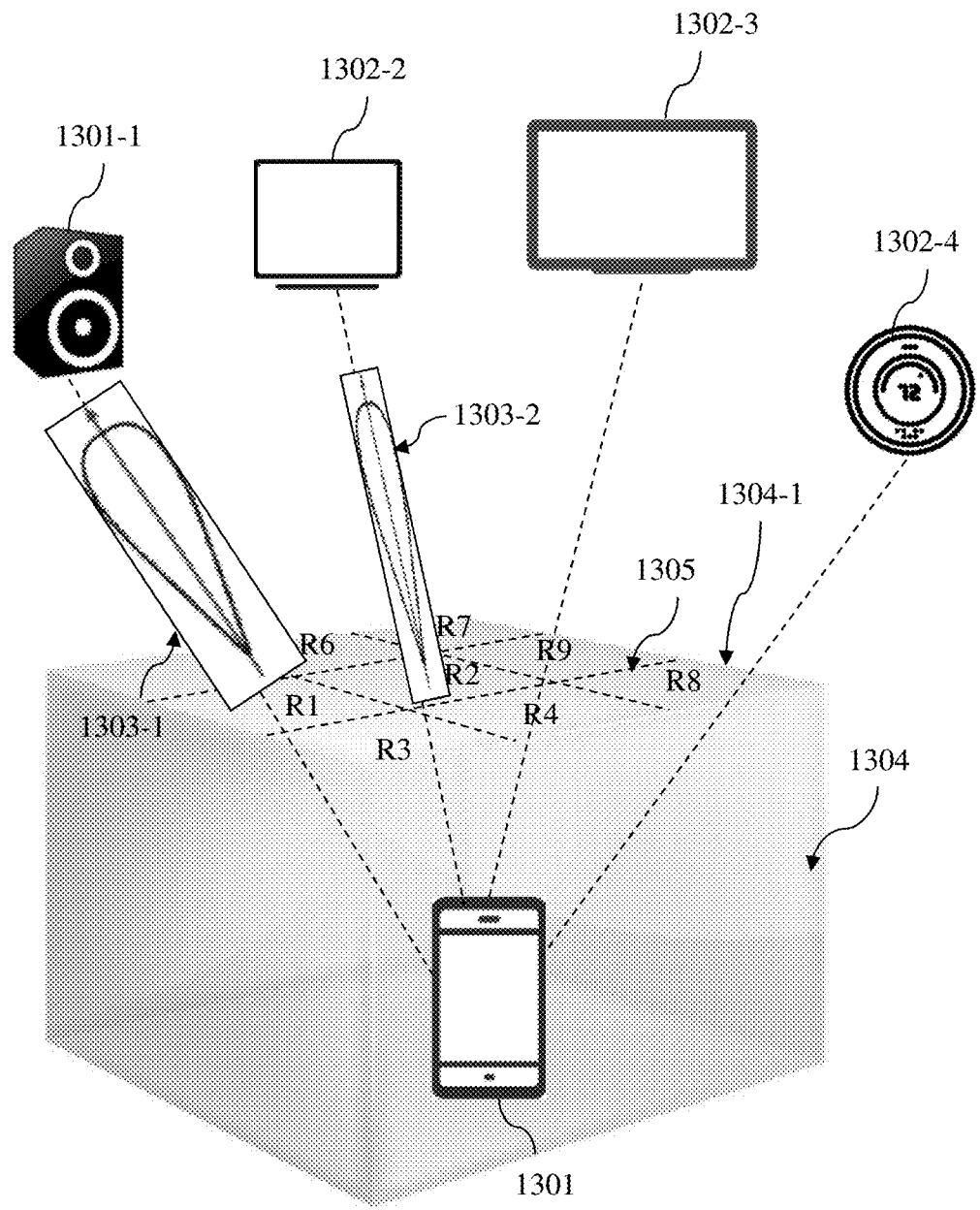

FIGS. 13A and 13B are diagrams for explaining an example beam forming method for user devices according to an embodiment. As illustrated in the FIG. 13A, a smartphone 1301 having an antenna may be communicatively coupled with a plurality of smart devices or Internet of things (IoT) devices 1302-1, 1302-2, 1302-3, and 1302-4 over a IoT network (represented by dashed arrows in FIG. 13A). The smart devices 1302-1, 1302-2, 1302-3, and 1302-4 may include, but are not limited to, a smart refrigerator, a smart air conditioner, a smart electric curtain, a smart lamp, a smart socket, a music system, smart speakers, smart thermostat, smart sensors, and a smart television. For the sake of brevity and clarity only four IoT devices as 1302-1, 1302-2, 1302-3, and 1302-4 are illustrated. The smartphone 1301 randomly selects OFBWs in direction of the IoT devices 1302-1 and 1302-2 as described earlier. The smartphone 1301 may then form highly directed and secure beams 1303-1 and 1303-2 in directions to the IoT devices 1302-1 and 1302-2 using selected OFBWs with minimal losses and interference.

Figure 14:
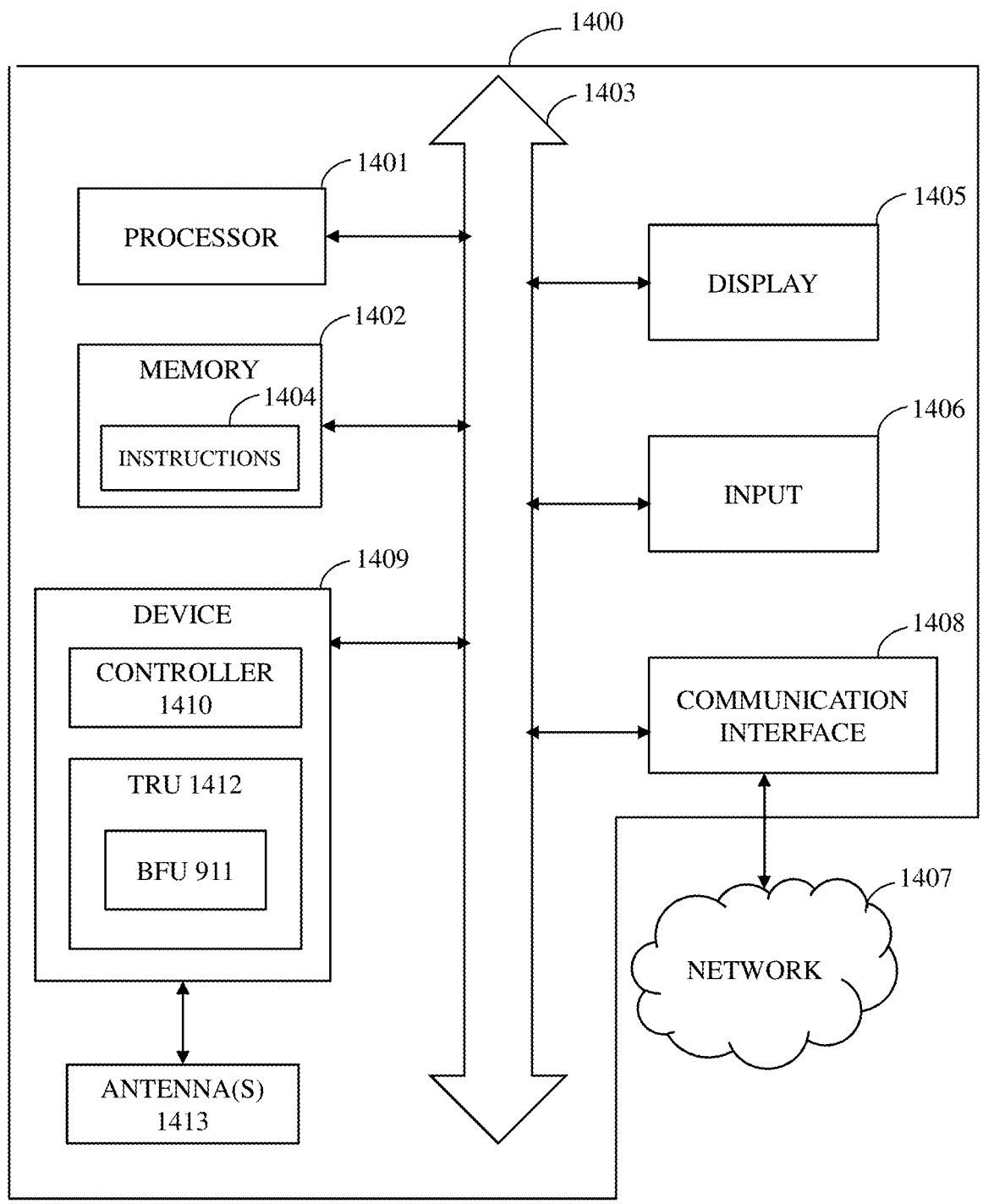
FIG. 14 is a block diagram of an example user device according to an embodiment.

Referring to FIG. 13B, the highly directed and secure beams may be selected based on user-input on a display of the smartphone. In some embodiments, the smartphone 1301 may display a virtual three-dimensional space 1304 in the form of a cube created around the smartphone 1301, as described earlier with reference to FIGS. 12A and 12B. In the example, the IoT devices 1302-1 and 1302-2 may be displayed as being located in a direction of a top face 1304-1. Therefore, top face 1304-1 may be selected as an OFZ. One or more grids 1305 may be then created on the top face 1304-1. The grids define portions that are representative of the OFBWs. For each portion of the grid, a ranking value is assigned as R1, R2, R3, . . . , etc., as described above. The ranking values may be assigned based on user-input. User-input indicative of secure codes and/or OFBWs with respect to the IoT devices 1302-1 and 1302-2 may be received. Based on the user-input, the highly directed and secure beams in the direction to the IoT devices 1302-1 and 1302-2 may be formed, thereby, reducing power consumption and improving the user-experience FIG. 14 is a block diagram of an example user device according to an embodiment. According to some embodiments, a user device 1400 may be included in a Multiple Input Multiple Output (MIMO) communication system, a Multiple Input Single Output (MISO) communication system, a Single Input Multiple Output (SIMO) communication system, etc., to send or receive signals in either of indoor environments and outdoor environments. Thus, in some embodiments, the user device 1400 may be user terminal such as smartphone, wearable devices, and a virtual reality (VR) device, unmanned aerial vehicles (UAVs), low earth orbit (LEO) satellites, autonomous small size robot such as drones, and Internet of Things (IoT) devices such as wireless modems, smart TV, etc. In other embodiments, the user device 1400 may also be part of a vehicle.

The user device 1400 may include a processor 1401, e.g., a central processing unit (CPU), a graphics processing unit (GPU), or both. The processor 1401 may be a component in a variety of systems. For example, the processor 1401 may be part of a standard personal computer or a workstation. The processor 1401 may be one or more general processors, digital signal processors, application specific integrated circuits, field programmable gate arrays, servers, networks, digital circuits, analog circuits, combinations thereof, or other devices for analyzing and processing data The processor 1401 may implement a software program, such as code generated manually (i.e., programmed).

The user device 1400 may include a memory 1402 that may communicate via a bus 1403. The memory 1402 may be a main memory, a static memory, or a dynamic memory. The memory 1402 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In an example, the memory 1402 includes a cache or random access memory for the processor 1401. In alternative examples, the memory 1402 is separate from the processor 1401, such as a cache memory of a processor, the system memory, or other memory. The memory 1402 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1402 is operable to store instructions 1404 executable by the processor 1401. The functions, acts or tasks illustrated in the drawings or described may be performed by the programmed processor 1401 executing the instructions stored in the memory 1402. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

The user device 1400 may further include a display 1405, such as a liquid crystal display (LCD), an organic light emitting diode (OLED), a flat panel display, a solid state display, a cathode ray tube (CRT), a projector, a printer or other display device for outputting determined information. The display 1405 may act as an interface for the user to see the functioning of the processor 1401, or other units. The user device 1400 may further include other output devices.

The user device 1400 may further include input 1406 configured to allow a user to interact with any of the components of user device 1400. The input device may be a number pad, a keyboard, or a cursor control device, such as a mouse, or a joystick, touch screen display, remote control or any other device operative to interact with the user device 1400.

The user device 1400 may be connected to a network 1407 to communicate voice, video, audio, images or any other data over the network 1407. Further, the instructions 1404 may be transmitted or received over the network 1407 via a communication port or network 1407 or using the bus 1403. The communication port or network 1407 may be a part of the processor 1401 or may be a separate component. The communication port 1408 may be created in software or may be a physical connection in hardware. The communication port 1408 may be configured to connect with the network 1407, external media, the display 1405, or any other components in user device 1400, or combinations thereof. The connection with the network 1407 may be a physical connection, such as a wired Ethernet connection or may be established wirelessly as discussed later. Likewise, the additional connections with other components of the user device 1400 may be physical connections or may be established wirelessly. The network 1407 may alternatively be directly connected to the bus 1403.

The network 1407 may include wired networks, wireless networks, Ethernet AVB networks, or combinations thereof. The wireless network may be a cellular telephone network, an 802.11, 802.16, 802.70, 802.1Q or Wi Max network. Further, the network 1407 may be a public network, such as the Internet, a private network, such as an intranet, or combinations thereof, and may utilize a variety of networking protocols including, but not limited to TCP/IP based networking protocols.

The user device 1400 may further include a device 1409 for forming a beam in accordance with the present disclosure. The device 1409 may be substantially identical to the device 200. The device 1409 may include a controller 1410 as described as the controller 202 in various embodiments above. The device 1409 may further include a forming unit (BFU) 1411 in a transmitting and receiving unit (TRU) 1412. The BFU 1411 may form at least one beam based on the optimum grids selected by the controller 1410, as described in various embodiments above. The TRU 1412 may transmit or receive a signal to/from a receiver through the at least one beam formed by the BFU 1411 via one or more antennas 1413. In some embodiments, the antenna(s) 1413 may transmit or receive the signal over millimeter waves (mmWV). Examples of the antenna(s) 1413 may include, but are not limited to, a beam antenna and an array antenna that may form one or more beams in a specific direction.

Further, in some embodiments, the device 1409 may be a separate component. In some embodiments, the device 1409 may be part of a dedicated radio frequency (RF) unit connected to the antenna(s) 1413. In some embodiments, the device 1409 may be a software component implemented in a physical layer of a digital radio frequency interface.

Figure 15:
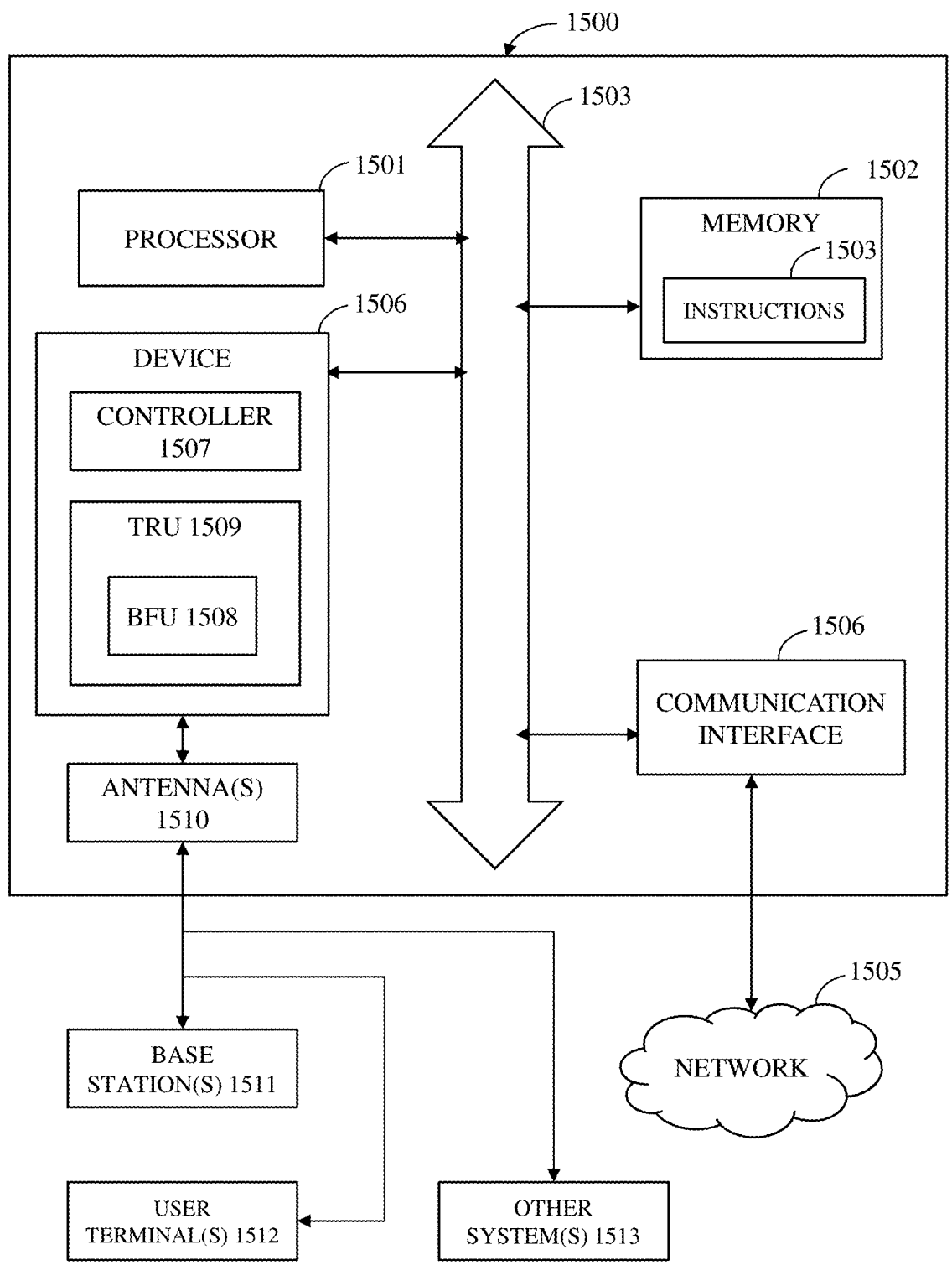
FIG. 15 is a block diagram an example base station according to an embodiment.

FIG. 15 is a block diagram an example base station according to an embodiment.

A base station 1500 may include a processor 1501, e.g., a central processing unit (CPU), a graphics processing unit (GPU), or both. The processor 1501 may be a component in a variety of systems. For example, the processor 1501 may be part of a standard personal computer or a workstation. The processor 1501 may be one or more general processors, digital signal processors, application specific integrated circuits, field programmable gate arrays, servers, networks, digital circuits, analog circuits, combinations thereof, or other devices for analyzing and processing data. The processor 1501 may implement a software program, such as code generated manually (i.e., programmed).

The base station 1500 may include a memory 1502 that may communicate via a bus 1503. The memory 1502 may be a main memory, a static memory, or a dynamic memory. The memory 1502 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In an example, the memory 1502 includes a cache or random access memory for the processor 1501. In alternative examples, the memory 1502 is separate from the processor 1501, such as a cache memory of a processor, the system memory, or other memory. The memory 1502 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 1502 is operable to store instructions 1504 executable by the processor 1501. The functions, acts or tasks illustrated in the drawings or described may be performed by the programmed processor 1501 executing the instructions stored in the memory 1502. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

The base station 1500 may be connected to a network 1505 to communicate voice, video, audio, images or any other data over the network 1505. Further, the instructions 1504 may be transmitted or received over the network 1505 via a communication port or network 1505 or using the bus 1503. The communication port or network 1505 may be a part of the processor 1501 or may be a separate component. The communication port 1506 may be created in software or may be a physical connection in hardware. The communication port 1506 may be configured to connect with the network 1505, external media, a display, or any other components in base station 1500, or combinations thereof. The connection with the network 1505 may be a physical connection, such as a wired Ethernet connection or may be established wirelessly as discussed later. Likewise, the additional connections with other components of the base station 1500 may be physical connections or may be established wirelessly. The network 1505 may alternatively be directly connected to the bus 1503.

The network 1505 may include wired networks, wireless networks, Ethernet AVB networks, or combinations thereof. The wireless network may be a cellular telephone network, an 802.11, 802.16, 802.70, 802.1Q or Wi Max network. Further, the network 1505 may be a public network, such as the Internet, a private network, such as an intranet, or combinations thereof, and may utilize a variety of networking protocols including, but not limited to TCP/IP based networking protocols.

The base station 1500 may further include a device 1506 for forming a beam in accordance with the present disclosure. The device 1506 may be substantially identical to the device 200. The device 1506 may include a controller 1507 as described as the controller 202 in various embodiments above. The device 1506 may further include a beam forming unit (BFU) 1508 within a transmitting and receiving unit (TRU) 1509. The BFU 1508 may form at least one beam based on the optimum grids selected by the controller 1507, as described in various embodiments above. The TRU 1509 may transmit or receive a signal to/from a receiver through the at least one beam formed by the BFU 1508 via one or more antennas 1510. In some embodiments, the antenna(s) 1510 may transmit or receive the signal over millimeter waves (mmWV). Examples of the antenna(s) 1510 may include, but not limited to, a beam antenna and an array antenna that may form a beam in a specific direction. A communication partner may be other base station(s) 1511, user-terminal(s) 1512 illustrated in FIG. 14, and other system(s) 1513 such as an IOT device, vehicle, and an autonomous small size robot.

While certain present exemplary embodiments of the disclosure have been illustrated and described herein, it is to be understood that the disclosure is not limited thereto and that the disclosure may be otherwise variously embodied, and practiced within the scope of the following claims.

What is claimed is:

1. A method comprising:
   determining a plurality of obstruction free beam windows (OFBWs);
   determining ranking values for the plurality of OFBWs based on a ranking parameter;
   selecting X OFBWs from the plurality of OFBWs based on the ranking values that are determined, X being a natural number determined randomly by a randomizer; and
   forming one or more beams based on the selected X OFBWs,
   wherein, when two or more OFBWs are ranked equal to each other based on the ranking values thereof, the X OFBW are selected based on window parameters of the two or more OFBWs.

2. The method of claim 1, further comprising:
   selecting at least one obstruction free zone (OFZ), wherein the plurality of OFBWs are determined within the selected at least one OFZ.

3. The method of claim 2, wherein the at least one OFZ is selected based on one or more of:
   at least one parameter of at least one reflected signal received from one or more zones;
   data corresponding to at least one obstruction available in the one or more zones; and
   data corresponding to at least one obstruction encountered during transmission of information via the one or more beams.

4. The method of claim 1, wherein the ranking parameter comprises one or more of a signal quality, an attenuation, a propagation delay, a network efficiency, a quality of service (QoS), a latency, a signal-to-noise ratio (SNR), a channel capacity, a signal-to-interference ratio, and a user-input of a reflected signal using each of the plurality of OFBWs.

5. The method of claim 1, wherein the X OFBWs are selected based on at least one selection parameter, the selection parameter including a channel quality index, a channel state, a current time, a current location of an antenna, a number of users, one or more frequencies for transmission of information via the one or more beams, a total number of the plurality of OFBWs, and window parameters of the plurality of OFBWs, wherein the window parameters include a length of the plurality of OFBWs and a parameter controlling spectral characteristics of the plurality of OFBWs.

6. The method of claim 1, further comprising:
   randomly assigning the one or more beams to one or more users.

7. The method of claim 1, wherein a control parameter of at least one OFBW of the plurality of OFBWs is controlled to cause a length of the at least one OFBW to be extended or shortened, or is controlled to cause the at least one OFBW to be divided.

8. The method of claim 1, wherein the one or more beams are formed based on a code selected from a codebook for transmission of information via the one or more beams.

9. A device comprising:
   a transmitting and receiving unit (TRU); and
   a controller coupled to the TRU and configured to:
   determine a plurality of obstruction free beam windows (OFBWs);
   determine ranking values for the plurality of OFBWs based on a ranking parameter;
   select X OFBWs from the plurality of OFBWs based on the ranking values that are determined, X being a natural number determined randomly by a randomizer of the device; and
   form one or more beams based on the selected X OFBWs,
   wherein, when two or more OFBWs are ranked equal to each other based on the ranking values thereof, the X OFBW are selected based on window parameters of the two or more OFBWs.

10. The device of claim 9, wherein the controller is further configured to:
    select at least one obstruction free zone (OFZ), wherein the plurality of OFBWs are determined within the selected at least one OFZ.

11. The device of claim 10, wherein the at least one OFZ is selected based on one or more of:
    at least one parameter of at least one reflected signal received from one or more zones;
    data corresponding to at least one obstruction available in the one or more zones; and
    data corresponding to at least one obstruction encountered during transmission of information via the one or more beams.

12. The device of claim 9, wherein the ranking parameter comprises one or more of a signal quality, an attenuation, a propagation delay, a network efficiency, a quality of service (QoS), a latency, a signal-to-noise ratio (SNR), a channel capacity, a signal-to-interference ratio, and a user-input of a reflected signal using each of the plurality of OFBWs.

13. The device of claim 9, wherein the X OFBWs are selected based on at least one selection parameter, the selection parameter including a channel quality index, a channel state, a current time, a current location of an antenna, a number of users, one or more frequencies for transmission of information via the one or more beams, a total number of the plurality of OFBWs, and window parameters of the plurality of OFBWs, wherein the window parameters include a length of the plurality of OFBWs and a parameter controlling spectral characteristics of the plurality of OFBWs.

14. The device of claim 9, wherein the controller is further configured to:
randomly assign the one or more beams to one or more users.

15. The device of claim 9, wherein a control parameter of at least one OFBW of the plurality of OFBWs is controlled to cause a length of the at least one OFBW to be extended or shortened, or is controlled to cause the at least one OFBW to be divided.

16. The device of claim 9, wherein the one or more beams are formed based on a code selected from a codebook for transmission of information via the one or more beams.

17. A device comprising:
a transmitting and receiving unit (TRU); and
a controller coupled to the TRU and configured to:
receive information regarding a beam from a base station, wherein the beam is formed based on an obstruction free beam window (OFBW) of X OFBWs which are selected from a plurality of OFBWs based on ranking values, where X is a natural number determined randomly by a randomizer of the base station;
select a beam based on the received information; and
communicate with the base station based on the selected beam,
wherein, when two or more OFBWs are ranked equal to each other based on the ranking values thereof, the X OFBWs are selected based on window parameters of the two or more OFBWs.

18. The device of claim 17, wherein the device communicates with the base station over millimeter waves.

* * * * *